US012277630B2

United States Patent
Aggarwal et al.

(10) Patent No.: US 12,277,630 B2
(45) Date of Patent: Apr. 15, 2025

(54) UNSUPERVISED STYLE AND COLOR CUES FOR TRANSFORMER-BASED IMAGE GENERATION

(71) Applicant: ADOBE INC., San Jose, CA (US)

(72) Inventors: Pranav Vineet Aggarwal, Santa Clara, CA (US); Midhun Harikumar, Sunnyvale, CA (US); Ajinkya Gorakhnath Kale, San Jose, CA (US)

(73) Assignee: ADOBE INC., San Jose, CA (US)

( * ) Notice: Subject to any disclaimer, the term of this patent is extended or adjusted under 35 U.S.C. 154(b) by 277 days.

(21) Appl. No.: 17/662,560

(22) Filed: May 9, 2022

(65) Prior Publication Data
US 2023/0360294 A1     Nov. 9, 2023

(51) Int. Cl.
| G06T 11/40 | (2006.01) |
| G06N 3/045 | (2023.01) |
| G06N 3/088 | (2023.01) |
| G06T 7/13 | (2017.01) |

(52) U.S. Cl.
CPC .............. *G06T 11/40* (2013.01); *G06N 3/045* (2023.01); *G06N 3/088* (2013.01); *G06T 7/13* (2017.01); *G06T 2207/20081* (2013.01); *G06T 2207/20084* (2013.01)

(58) Field of Classification Search
CPC .... G06N 3/0475; G06N 3/0495; G06N 3/045; G06N 3/0455; G06N 3/0464; G06N 3/088; G06T 7/13; G06T 11/40; G06T 11/00; G06T 2207/20084; G06T 2207/20081
See application file for complete search history.

(56) References Cited

U.S. PATENT DOCUMENTS

| 10,410,351 | B2 * | 9/2019 | Lin .................... G06N 3/044 |
| 10,734,024 | B1 * | 8/2020 | Soni .................... G11B 27/28 |
| 11,216,505 | B2 | 1/2022 | Motiian et al. |
| 11,656,851 | B2 * | 5/2023 | Clement ............... G06N 3/045 |
| | | | 717/106 |
| 2012/0092359 | A1 * | 4/2012 | O'Brien-Strain .... H04N 1/6041 |
| | | | 345/589 |

(Continued)

OTHER PUBLICATIONS

1Park, et al., "Swapping Autoencoder for Deep Image Manipulation", In Advances in Neural Information Processing Systems, 2020, 14 pages.

(Continued)

*Primary Examiner* — Abderrahim Merouan
(74) *Attorney, Agent, or Firm* — F. CHAU & ASSOCIATES, LLC

(57) ABSTRACT

Systems and methods for image processing are configured. Embodiments of the present disclosure identify target style attributes and target structure attributes for a composite image; generate a matrix of composite feature tokens based on the target style attributes and the target structure attributes, wherein subsequent feature tokens of the matrix of composite feature tokens are sequentially generated based on previous feature tokens of the matrix of composite feature tokens according to a linear ordering of the matrix of composite feature tokens; and generate the composite image based on the matrix of composite feature tokens, wherein the composite image includes the target style attributes and the target structure attributes.

19 Claims, 20 Drawing Sheets

(56) References Cited

U.S. PATENT DOCUMENTS

| | | | |
|---|---|---|---|
| 2014/0270489 A1* | 9/2014 | Lim | G06F 18/40 |
| | | | 382/159 |
| 2015/0297949 A1* | 10/2015 | Aman | G06T 7/246 |
| | | | 348/157 |
| 2017/0011010 A1* | 1/2017 | Eom | G06F 40/103 |
| 2018/0357259 A1* | 12/2018 | Jin | G06N 3/08 |
| 2018/0357519 A1* | 12/2018 | Jin | G06V 10/764 |
| 2019/0026870 A1* | 1/2019 | Hu | G06T 5/77 |
| 2020/0294294 A1* | 9/2020 | Petriv | G06N 3/08 |
| 2021/0012102 A1* | 1/2021 | Cristescu | G06F 40/284 |
| 2021/0077063 A1* | 3/2021 | Swisher | G06T 11/00 |
| 2021/0142208 A1* | 5/2021 | Osogami | G06N 20/00 |
| 2021/0174128 A1* | 6/2021 | Charnock | G06V 10/751 |
| 2021/0264655 A1* | 8/2021 | Chen | G06T 3/18 |
| 2021/0334908 A1* | 10/2021 | Shu | G06Q 50/01 |
| 2021/0358164 A1* | 11/2021 | Liu | G06N 3/088 |
| 2021/0382936 A1* | 12/2021 | Tomar | G06N 20/00 |
| 2021/0383095 A1* | 12/2021 | Maurer | G06V 40/50 |
| 2021/0383589 A1* | 12/2021 | Risser | G06N 3/045 |
| 2022/0012596 A1* | 1/2022 | Nie | G06T 11/60 |
| 2022/0084165 A1* | 3/2022 | Hsiao | G06T 3/40 |
| 2022/0138432 A1* | 5/2022 | Galitsky | G06F 40/211 |
| | | | 704/9 |
| 2022/0165373 A1* | 5/2022 | Kim | G06F 40/30 |
| 2022/0214863 A1* | 7/2022 | Clement | G06N 3/044 |
| 2022/0229980 A1* | 7/2022 | Jin | G06N 3/044 |
| 2022/0334258 A1* | 10/2022 | Kim | G01S 7/497 |
| 2022/0374709 A1* | 11/2022 | Kim | G06N 3/0464 |
| 2023/0045076 A1* | 2/2023 | Huang | G06V 10/82 |
| 2023/0068103 A1* | 3/2023 | Zhou | G06F 16/583 |
| 2023/0128200 A1* | 4/2023 | Clement | G06N 3/084 |
| | | | 717/106 |
| 2023/0168146 A1* | 6/2023 | Good | G06T 7/0002 |
| | | | 348/407.1 |
| 2023/0245363 A1* | 8/2023 | Park | G06T 11/60 |
| | | | 345/629 |
| 2023/0274420 A1* | 8/2023 | Seah | G16H 50/20 |
| | | | 382/128 |
| 2023/0351558 A1* | 11/2023 | Chen | G06T 5/60 |
| 2023/0360294 A1* | 11/2023 | Aggarwal | G06N 3/0475 |
| 2023/0419551 A1* | 12/2023 | Harikumar | G06T 7/10 |

OTHER PUBLICATIONS

2Esser, et al., "Taming Transformers for High-Resolution Image Synthesis", In Proceedings of the IEEE Computer Vision Foundation, (2020), pp. 12873-12883.

3Radford, et al., "Learning Transferable Visual Models From Natural Language Supervision", In Proceedings of the 38th International Conference on Machine Learning, PMLR 139, 2021, 16 pages.

* cited by examiner

UNSUPERVISED STYLE AND COLOR CUES FOR TRANSFORMER-BASED IMAGE GENERATION

BACKGROUND

The following relates generally to digital image processing, and more specifically to image generation using machine learning. Digital image processing refers to the use of a computer to edit a digital image or synthesize an image using an algorithm or a processing network. Image generation is a subfield of image processing. A machine learning model is used to generate a composite image (i.e., hybrid image) through combining image features from different source images.

In some cases, background images are abstract and users may not be able to describe these background images effectively with keywords in a search query. Accordingly, conventional image generation systems fail to generate a satisfactory composite image when user query is not clear or not representative of user requirement. Therefore, there is a need in the art for an improved image generation system that can efficiently and accurately perform image generation based on source images.

SUMMARY

The present disclosure describes systems and methods for image processing. Embodiments of the present disclosure include an image generation apparatus configured to perform attribute transfer to obtain a composite image based on target style attributes and target structure attributes. An image generation apparatus generates a composite image based on a style image and a structure image (e.g., a black and white "sketch" image that shows structural edges). Some embodiments of the present disclosure generate composite image features (i.e., a matrix of composite feature tokens in a VQGAN latent space) sequentially, row by row, so that each block of features incorporates the context of nearby features. In some examples, a swapping autoencoder (SAE) model extracts target style features from the style image. The target style features and a sequence of structure feature tokens are combined to obtain a combined sequence of feature tokens. At inference, a transformer model of the image generation apparatus performs next token prediction based on the combined sequence of feature tokens (i.e., concatenated conditional and image tokens). The transformer model generates a next feature token in a row of the matrix of composite feature tokens based on a set of previous feature tokens.

A method, apparatus, and non-transitory computer readable medium for image processing are described. One or more embodiments of the method, apparatus, and non-transitory computer readable medium include identifying target style attributes and target structure attributes for a composite image; generating a matrix of composite feature tokens based on the target style attributes and the target structure attributes, wherein subsequent feature tokens of the matrix of composite feature tokens are sequentially generated based on previous feature tokens of the matrix of composite feature tokens according to a linear ordering of the matrix of composite feature tokens; and generating the composite image based on the matrix of composite feature tokens, wherein the composite image includes the target style attributes and the target structure attributes.

A method, apparatus, and non-transitory computer readable medium for training a machine learning model are described. One or more embodiments of the method, apparatus, and non-transitory computer readable medium include generating style features of an image using a swapping autoencoder (SAE) model; generating a sketch image from the image using an edge detection model; generating a matrix of structure feature tokens based on the sketch image using a sketch encoder; generating a matrix of composite feature tokens based on the style features of the image and the matrix of structure feature tokens using a transformer model, wherein subsequent feature tokens of the matrix of composite feature tokens are sequentially generated based on previous feature tokens of the matrix of composite feature tokens according to a linear ordering of the matrix of composite feature tokens; generating a matrix of supervision tokens for the image using an image encoder; computing a classification loss based on the matrix of composite feature tokens and the matrix of supervision tokens, wherein each supervision token of the matrix of supervision tokens is selected from a pre-determined collection of tokens; and updating parameters of the transformer model based on the classification loss.

An apparatus and method for image processing are described. One or more embodiments of the apparatus and method include a swapping autoencoder (SAE) model configured to generate target style features based on a style image, wherein the target style features represent target style attributes for a composite image; a sketch encoder configured to generate a matrix of structure feature tokens based on a sketch image, wherein the matrix of structure feature tokens represents target structure attributes of the sketch image; a transformer model configured to generate a matrix of composite feature tokens based on the target style features and the matrix of structure feature tokens, wherein subsequent feature tokens of the matrix of composite feature tokens are sequentially generated based on previous feature tokens of the matrix of composite feature tokens according to a linear ordering of the matrix of composite feature tokens; and an image generator configured to generate the composite image based on the matrix of composite feature tokens, wherein the composite image includes the target style attributes and the target structure attributes.

DETAILED DESCRIPTION

Figure 1:
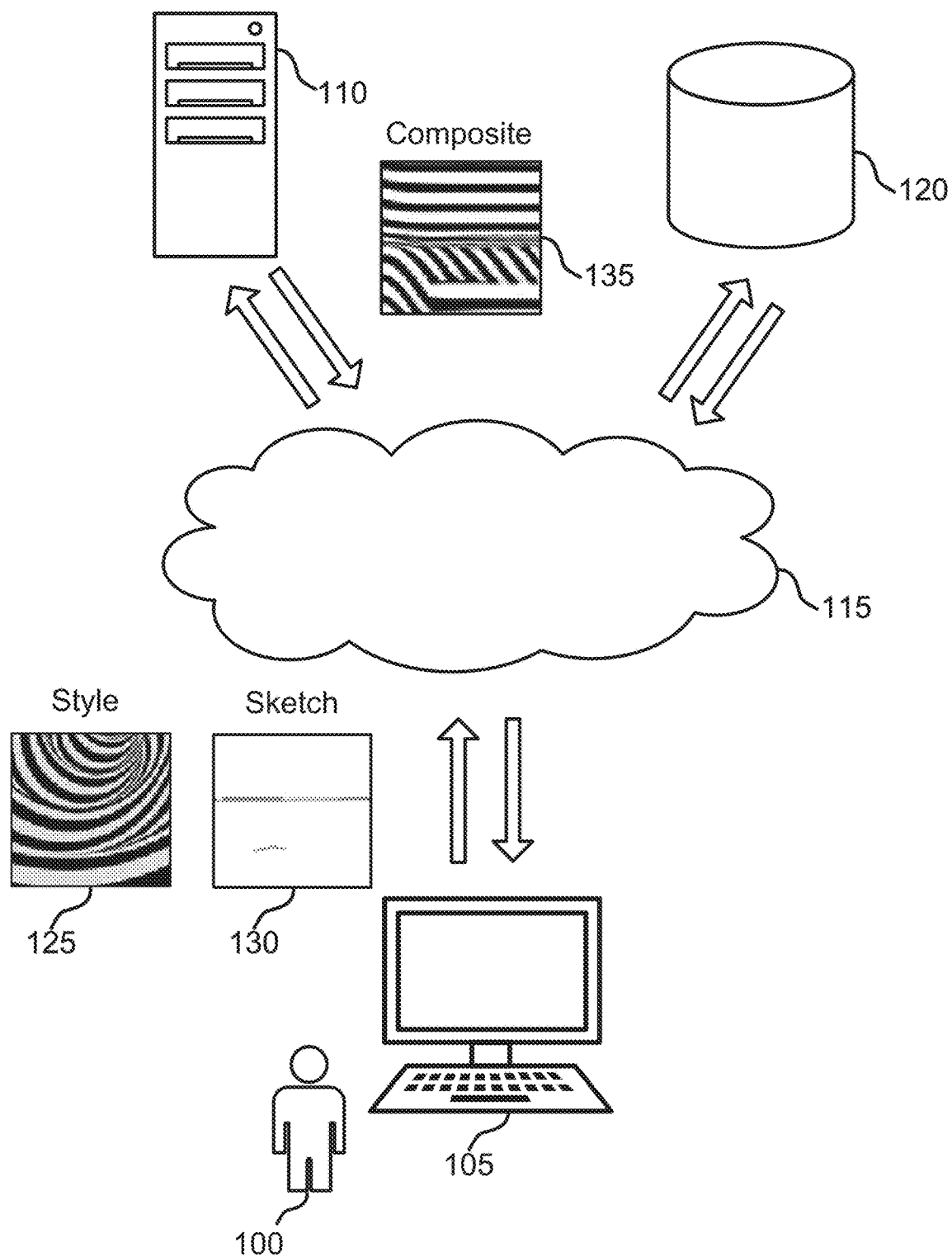
FIG. 1 shows an example of an image generation system according to aspects of the present disclosure.

The present disclosure describes systems and methods for image processing. Embodiments of the present disclosure include an image generation apparatus configured to perform attribute transfer to obtain a composite image based on target style attributes and target structure attributes. An image generation apparatus generates a composite image based on a style image and a structure image (e.g., a black and white "sketch" image that shows structural edges). Some embodiments of the present disclosure generate composite image features (i.e., a matrix of composite feature tokens in a VQGAN latent space) sequentially, row by row, so that each block of features incorporates the context of nearby features. In some examples, a swapping autoencoder (SAE) model extracts target style features from the style image. The target style features and a sequence of structure feature tokens are combined to obtain a combined sequence of feature tokens. At inference, a transformer model of the image generation apparatus performs next token prediction based on the combined sequence of feature tokens (i.e., concatenated conditional and image tokens). The transformer model generates a next feature token in a row of the matrix of composite feature tokens based on a set of previous feature tokens.

Users often search for background images in their search queries. Background images can be used in presentation slides, marketing documents, etc. In some cases, users spend hours sifting through a large amount of assets to locate an appropriate background image. Background images are abstract and hence users have a hard time describing them in their search queries. Accordingly, certain attributes in background images may not appeal to users such as style, color, structure, etc.

Conventional systems perform color correction to convert a background image per user request. In some examples, titles or tags stored in image retrieval systems include generic background shapes that are not descriptive of various facets, color palettes, and styles associated with the images. Image editing tools such as Photoshop® may be used to modify the style of an image, but such tools are difficult for average users when more complex layered background patterns are involved. As a result, users have a hard time generating a custom background image and user experience is decreased.

Embodiments of the present disclosure include an image generation apparatus configured to generate a composite image given a structure image and a style image. The composite image captures target style attributes from the style image and target structure attributes from the structure image. In some examples, an edge detection model generates a sketch image based on the structure image. A swapping autoencoder model disentangles the target style features and structure features, where the target style features are used in subsequent steps.

According to at least one embodiment, the image generation apparatus includes vector quantized generative adversarial network (VQGAN) model. The VQGAN model is an autoencoder model that learns to compress an input image to a tokenized representation in a compressed space. The tokenized representation may be referred to as a codebook. The VQGAN model comprises an image encoder and an image generator/decoder. At training, the VQGAN model takes a sketch image as input and outputs a quantized codebook representation (i.e., a sketch codebook). Another VQGAN model takes a style image as input and outputs another quantized codebook representation (i.e., a style codebook). During training, the style codebook is provided to train a transformer model of the image generation apparatus to look at prior context. The image generation apparatus orders the sketch codebook and the style codebook into a sequence of style feature tokens and sketch feature tokens. The target style features obtained from the swapping autoencoder model are inserted at a beginning location of the sequence of style feature tokens and sketch feature tokens. The image generation apparatus combines the sequence of style feature tokens and sketch feature tokens and the target style features to obtain a combined sequence of feature tokens. The transformer model of the image generation apparatus then makes next token prediction based on the combined sequence of feature tokens. At inference, the VQGAN model generates the sketch cookbook and takes a feature vector (e.g., style, color, text, etc.) and generates the code words corresponding to a composite image (e.g., a stylized image). The codes words are then input to an image decoder (e.g., RGB image decoder) to generate the composite image.

Additionally, a training component of the image generation apparatus trains the VQGAN model for image and the VQGAN model for sketch. The swapping autoencoder model is trained on a same dataset as the VQGAN models. The transformer model is trained by masking the feature tokens of the matrix of composite feature tokens. For example, a feature token is masked and transformer model learns to predict the masked feature token by looking at prior context. As such, the transformer model generates the matrix of composite feature tokens based on the target style attributes and the target structure attributes, where subsequent feature tokens of the matrix of composite feature tokens are sequentially generated based on previous feature tokens of the matrix of composite feature tokens according to a linear ordering of the matrix of composite feature tokens. That is, the transformer model generates composite image features (i.e., "the matrix of composite feature tokens" in a VQGAN latent space) sequentially, row by row, so that each block of features incorporates the context of nearby features.

In some examples, the image generation apparatus takes SAE style embeddings from multiple style images and averages these style embedding as the style cue (i.e., multiple style conditioning). In some examples, the image generation apparatus extracts a first SAE style embedding from a first style image and applies to a first area of a composite image. The image generation apparatus then takes a second SAE style embedding from a second style image and applies to a second area of the composite image (i.e., spatial mixing of styles). In some embodiments, the image generation apparatus can process other types of conditional transformation such as color, semantics, etc. Users select one or more random styles or color palettes as conditioning and the image generation apparatus automatically generates different composite images (background variations) based on the selected conditioning. As a result, quality and variety of composite images is increased and the image generation apparatus can output a wide variety of background images for users content creation.

Embodiments of the present disclosure may be used in the context of image processing applications. For example, an image generation network based on the present disclosure may take a style image and a sketch image and efficiently generate a composite image for subsequent user manipulation. An example application according to embodiments of the present disclosure is provided with reference to FIG. 6. Details regarding the architecture of an example image generation apparatus are provided with reference to FIGS. 1-5. Example processes for image generation are provided with reference to FIGS. 6-16. Example training processes are described with reference to FIGS. 17-20.

Network Architecture

In FIGS. 1-5, an apparatus and method for image processing are described. One or more embodiments of the apparatus and method include a swapping autoencoder (SAE) model configured to generate target style features based on a style image, wherein the target style features represent target style attributes for a composite image; a sketch encoder configured to generate a matrix of structure feature tokens based on a sketch image, wherein the matrix of structure feature tokens represents target structure attributes of the sketch image; a transformer model configured to generate a matrix of composite feature tokens based on the target style features and the matrix of structure feature tokens, wherein subsequent feature tokens of the matrix of composite feature tokens are sequentially generated based on previous feature tokens of the matrix of composite feature tokens according to a linear ordering of the matrix of composite feature tokens; and an image generator configured to generate the composite image based on the matrix of composite feature tokens, wherein the composite image includes the target style attributes and the target structure attributes.

In some examples, the sketch encoder comprises a vector quantized generative adversarial network (VQGAN) encoder and the image generator comprises a VQGAN decoder. Some examples of the apparatus and method further include a multi-modal encoder configured to generate a text embedding representing additional target style attributes, wherein the matrix of composite feature tokens is generated based on the text embedding. In some examples, the multi-modal encoder includes contrastive language-image pre-training (CLIP) network.

FIG. 1 shows an example of an image generation system according to aspects of the present disclosure. The example shown includes user 100, user device 105, image generation apparatus 110, cloud 115, database 120, style image 125, sketch image 130, and composite image 135. Image generation apparatus 110 is an example of, or includes aspects of, the corresponding element described with reference to FIG. 2. Style image 125 is an example of, or includes aspects of, the corresponding element described with reference to FIGS. 7 and 20. sketch image 130 is an example of, or includes aspects of, the corresponding element described with reference to FIGS. 7, 9, and 18. Composite image 135 is an example of, or includes aspects of, the corresponding element described with reference to FIGS. 7-10, 15, and 16.

As an example shown in FIG. 1, user 100 uploads style image 125 and sketch image 130 via user device 105. Style image 125 and sketch image 130 are input to image generation apparatus 110, e.g., via cloud 115. In some examples, sketch image 130 is generated from a structure image using an edge detection model. User 100 is interested in synthesizing style image 125 and sketch image 130 to obtain composite image 135, where composite image 135 integrates target style attributes from style image 125 and target structure attributes from sketch image 130. Composite image 135 is returned to user 100 via cloud 115 and user device 105.

In some examples, image generation apparatus 110 generates composite image 135 based on style image 125 and sketch image 130 (e.g., a black and white sketch image that shows structural edges). A transformer model of image generation apparatus 110 is trained to generate composite image features (i.e., "a matrix of composite feature tokens" in a VQGAN latent space) sequentially, row by row, so that each block of features incorporates the context of nearby features. The structure in the form of sketches guides the structure of composite image 135 while maintaining the style or color which was represented in style image 125.

User device 105 may be a personal computer, laptop computer, mainframe computer, palmtop computer, personal assistant, mobile device, or any other suitable processing apparatus. In some examples, user device 105 includes software that incorporates an image editing application. The image editing application may either include or communicate with image generation apparatus 110.

A user interface may enable users to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI).

According to some embodiments, image generation apparatus 110 identifies target style attributes and target structure attributes for a composite image. Image generation apparatus 110 generates a matrix of composite feature tokens based on the target style attributes and the target structure attributes, where subsequent feature tokens of the matrix of composite feature tokens are sequentially generated based on previous feature tokens of the matrix of composite feature tokens according to a linear ordering of the matrix of composite feature tokens. Image generation apparatus 110 generates the composite image based on the matrix of composite feature tokens, wherein the composite image includes the target style attributes and the target structure attributes. Image generation apparatus 110 returns the composite image to user 100. The process of using image generation apparatus 110 is further described with reference to FIG. 6.

Image generation apparatus 110 includes a computer implemented network comprising a swapping autoencoder (SAE) model, an edge detection model, a sketch encoder, a color encoder, a transformer model, an image generator, and a multi-modal encoder. Image generation apparatus 110 may also include a processor unit, a memory unit, an I/O module, and a training component. In some examples, the training component is part of another apparatus other than image generation apparatus 110. The training component is used to train a machine learning model (or an image generation network). Additionally, image generation apparatus 110 can communicate with database 120 via cloud 115. In some cases, the architecture of the image generation network is also referred to as a network or a network model. Further detail regarding the architecture of image generation apparatus 110 is provided with reference to FIGS. 2-5. Further detail regarding the operation of image generation apparatus 110 is provided with reference to FIGS. 6-16.

In some cases, image generation apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

Cloud 115 is a computer network configured to provide on-demand availability of computer system resources, such as data storage and computing power. In some examples, the cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
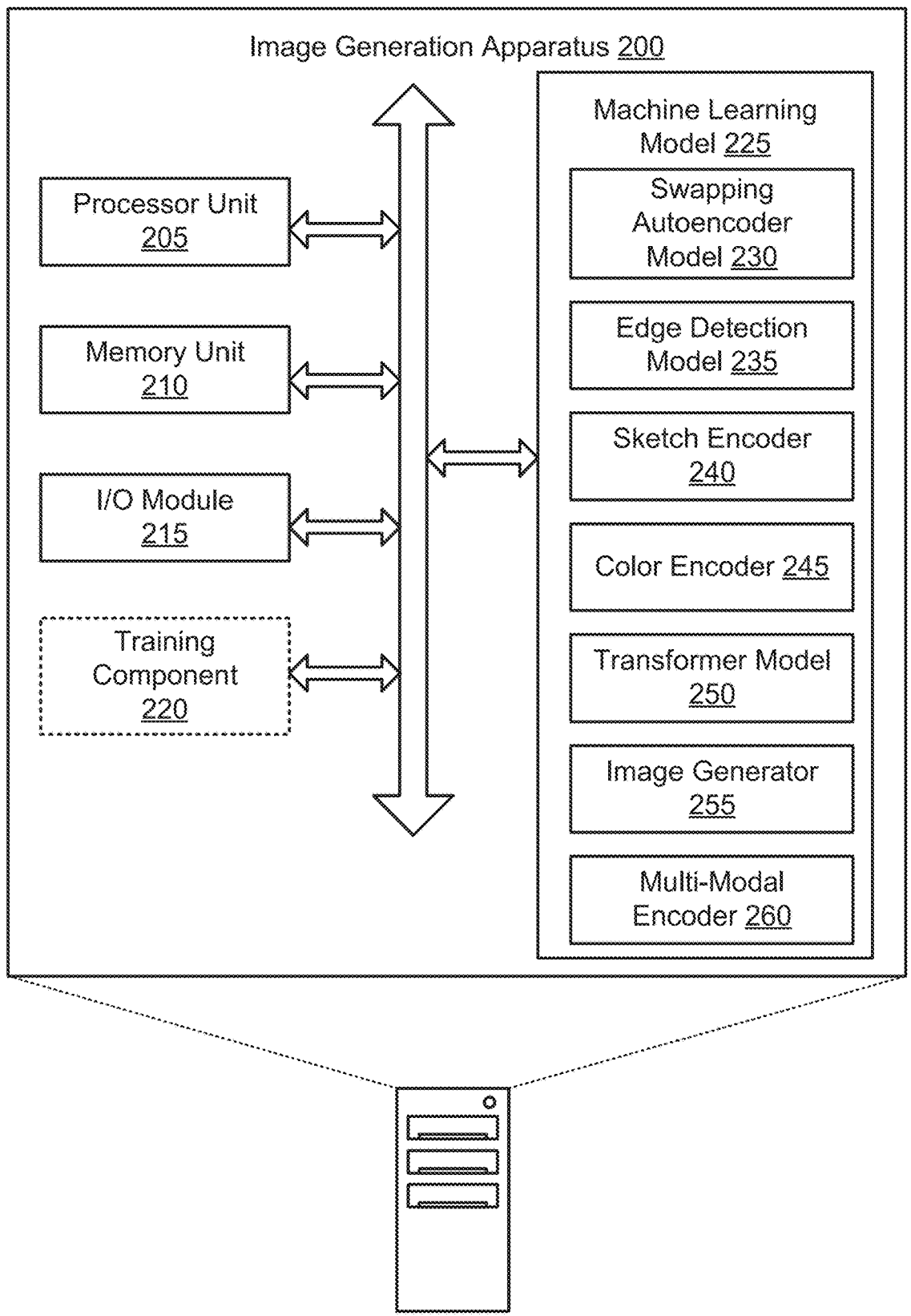
FIG. 2 shows an example of an image generation apparatus according to aspects of the present disclosure.

FIG. 2 shows an example of an image generation apparatus 200 according to aspects of the present disclosure. The example shown includes image generation apparatus 200, processor unit 205, memory unit 210, I/O module 215, training component 220, and machine learning model 225. Machine learning model 225 includes swapping autoencoder model 230, edge detection model 235, sketch encoder 240, color encoder 245, transformer model 250, image generator 255, and multi-modal encoder 260. Image generation apparatus 200 is an example of, or includes aspects of, the corresponding element described with reference to FIG. 1. According to some embodiments, machine learning model 225 identifies target style attributes and target structure attributes for a composite image. Machine learning model 225 is an example of, or includes aspects of, the corresponding element described with reference to FIG. 3.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into processor unit 205. In some cases, processor unit 205 is configured to execute computer-readable instructions stored in a memory to perform various functions. In some embodiments, processor unit 205 includes special purpose components for modem processing, baseband processing, digital signal processing, or transmission processing.

Examples of memory unit 210 include random access memory (RAM), read-only memory (ROM), or a hard disk. Examples of memory unit 210 include solid state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 215 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image generation apparatus 200 includes a computer implemented artificial neural network (ANN) for generating a composite image based on a matrix of composite feature tokens. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During a training process, these weights are adjusted to increase the accuracy of the result (e.g., attempting to minimize a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, image generation apparatus 200 includes a convolutional neural network (CNN) for image synthesis. CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In some embodiments, image generation apparatus 200 includes a generative adversarial network (GAN). GAN is a category of ANN where two neural networks are trained based on a contest with each other. Given a training set, the network learns to generate new data with similar properties as the training set. For example, a GAN trained on photographs can generate new images that look authentic to a human observer. GANs may be used in conjunction with supervised learning, semi-supervised learning, unsupervised learning, and reinforcement learning. In some examples, a GAN includes a generator network and a discriminator network. The generator network generates candidates while the discriminator network evaluates them. The generator network learns to map from a latent space to a data distribution of interest, while the discriminator network distinguishes candidates produced by the generator from the true data distribution. The generator network's training objective is to increase the error rate of the discriminator network (i.e., to produce novel candidates that the discriminator network classifies as real).

According to some embodiments, training component 220 computes a classification loss based on the matrix of composite feature tokens and the matrix of supervision tokens, where each supervision token of the matrix of supervision tokens is selected from a pre-determined collection of tokens. In some examples, training component 220 updates parameters of the transformer model 250 based on the classification loss. In some examples, training component 220 trains the image encoder using an image training set based on a vector quantized generative adversarial network (VQGAN) training method. Training component 220 trains the sketch encoder 240 using a sketch training set based on a VQGAN training method. In some examples, training component 220 trains a swapping autoencoder model 230 by swapping structure attributes and style attributes of a first training image and a second training image.

According to some embodiments, swapping autoencoder model 230 generates target style features and dispensable structure features based on a style image that includes at least a portion of the target style attributes, where the target style features represent the target style attributes. In some examples, swapping autoencoder model 230 identifies an additional style image. Swapping autoencoder model 230 generates additional target style features based on the additional style image. In some examples, swapping autoencoder model 230 identifies a spatial weighting for the style image and the additional style image, where the target style features and the additional target style features are combined based on the spatial weighting. In some examples, the target style attributes include color information, texture information, lighting information, high frequency information, or any combination thereof. According to some embodiments, swapping autoencoder model 230 generates style features of an image.

According to some embodiments, swapping autoencoder model 230 is configured to generate target style features based on a style image, where the target style features represent target style attributes for a composite image. Swapping autoencoder model 230 is an example of, or includes aspects of, the corresponding element described with reference to FIGS. 3, 4, and 20.

According to some embodiments, edge detection model 235 receives a structure image that includes the target structure attributes. In some examples, edge detection model 235 generates a sketch image of the structure image, where the sketch image includes the target structure attributes.

According to some embodiments, sketch encoder 240 receives a grayscale image that includes the target structure attributes. In some examples, sketch encoder 240 generates a grayscale image embedding that represents the target structure attributes based on the grayscale image, where the matrix of composite feature tokens is generated based on the grayscale image embedding and the color palette. In some examples, sketch encoder 240 generates a matrix of structure feature tokens based on the sketch image.

According to some embodiments, sketch encoder 240 is configured to generate a matrix of structure feature tokens based on a sketch image, wherein the matrix of structure feature tokens represents target structure attributes of the sketch image. In some examples, the sketch encoder 240 includes a vector quantized generative adversarial network (VQGAN) encoder and the image generator 255 includes a VQGAN decoder. Sketch encoder 240 is an example of, or includes aspects of, the corresponding element described with reference to FIGS. 3, 18, and 20.

According to some embodiments, color encoder 245 selects a color palette of a style image, where the color palette includes color distribution information of the style image, and where the target style attributes include the color palette. Color encoder 245 is an example of, or includes aspects of, the corresponding element described with reference to FIGS. 4 and 14.

According to some embodiments, transformer model 250 generates a matrix of composite feature tokens based on the target style attributes and the target structure attributes, where subsequent feature tokens of the matrix of composite feature tokens are sequentially generated based on previous feature tokens of the matrix of composite feature tokens according to a linear ordering of the matrix of composite feature tokens. In some examples, transformer model 250 combines the target style features and the additional target style features to obtain combined target style features, where the matrix of composite feature tokens is generated based on the combined target style features.

In some examples, transformer model 250 orders structure feature tokens of a matrix of structure feature tokens to obtain a sequence of structure feature tokens. Transformer model 250 combines the sequence of structure feature tokens with target style features to obtain a combined sequence of feature tokens, where the matrix of composite feature tokens is generated based on the combined sequence of feature tokens according to the linear ordering. In some examples, transformer model 250 identifies a row of the matrix of composite feature tokens. Transformer model 250 identifies a set of previous feature tokens in the row of the matrix of composite feature tokens. Transformer model 250 generates a next feature token in the row of the matrix of composite feature tokens based on the set of previous feature tokens in the row of the matrix of composite feature tokens. In some examples, transformer model 250 identifies a row of the matrix of structure feature tokens corresponding to the row of the matrix of composite feature tokens, where the next feature token is generated based on the row of the matrix of structure feature tokens. In some examples, the next feature token in the row of the matrix of composite feature tokens is generated independently of a previous row in the matrix of composite feature tokens. In some examples, each composite feature token of the matrix of composite feature tokens represents a vector from a vector quantized generative adversarial network (VQGAN) codebook.

According to some embodiments, transformer model 250 is configured to generate a matrix of composite feature tokens based on the target style features and the matrix of structure feature tokens, wherein subsequent feature tokens of the matrix of composite feature tokens are sequentially generated based on previous feature tokens of the matrix of composite feature tokens according to a linear ordering of the matrix of composite feature tokens. Transformer model 250 is an example of, or includes aspects of, the corresponding element described with reference to FIGS. 3, 4, 14, and 20.

According to some embodiments, image generator 255 generates the composite image based on the matrix of composite feature tokens, where the composite image includes the target style attributes and the target structure attributes. Image generator 255 is an example of, or includes aspects of, the corresponding element described with reference to FIGS. 4, 5, 18, and 19.

According to some embodiments, multi-modal encoder 260 receives a text query that specifies at least a portion of the target style attributes. Multi-modal encoder 260 generates a text embedding based on the text query, where the matrix of composite feature tokens is generated based on the text embedding.

According to some embodiments, multi-modal encoder 260 is configured to generate a text embedding representing additional target style attributes, where the matrix of composite feature tokens is generated based on the text embedding.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 3:
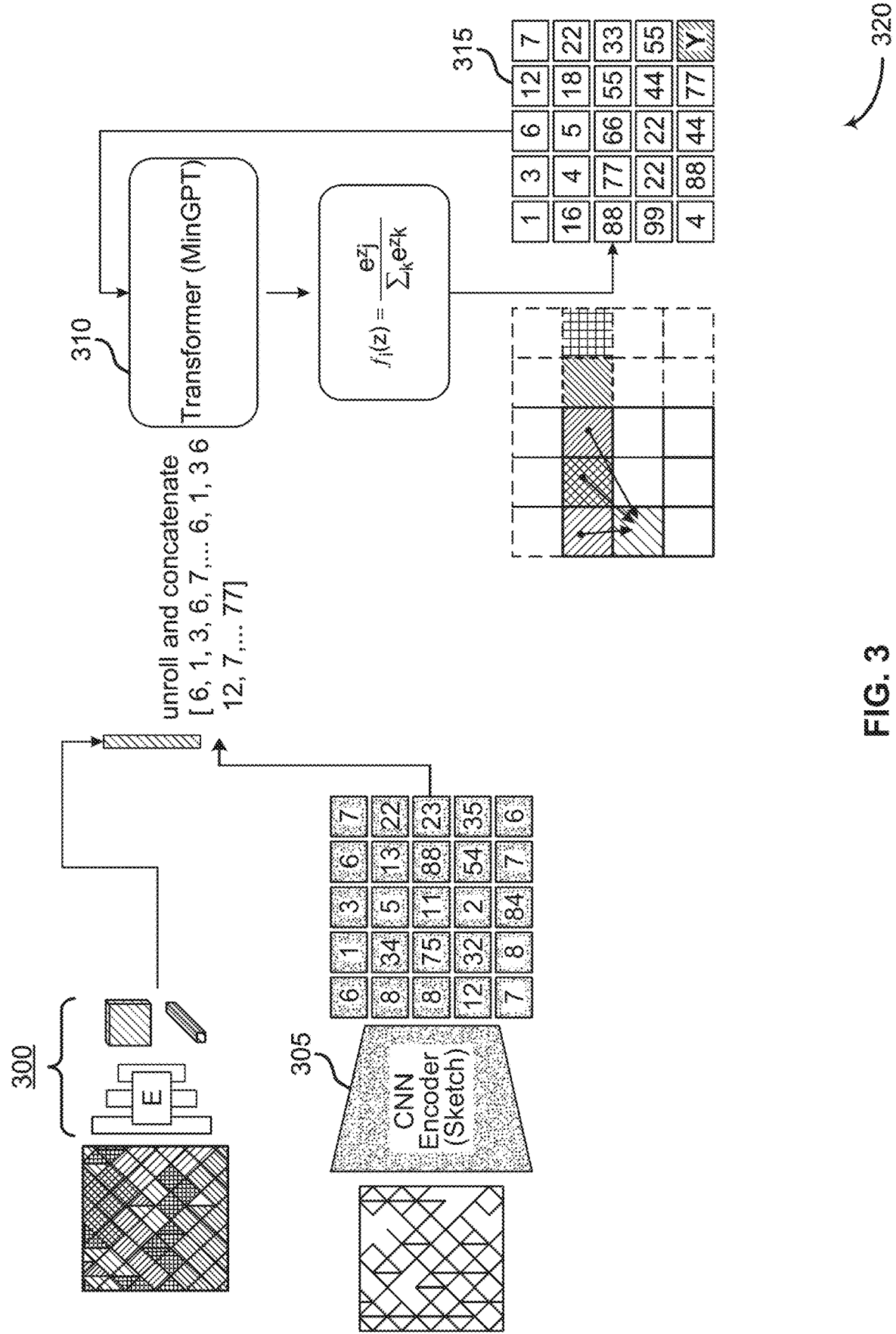
FIG. 3 shows an example of a machine learning model according to aspects of the present disclosure.

FIG. 3 shows an example of a machine learning model 320 according to aspects of the present disclosure. The example shown includes swapping autoencoder model 300, sketch encoder 305, transformer model 310, matrix of composite feature tokens 315, and machine learning model 320. FIG. 3 shows machine learning model 320 and an operation of applying machine learning model 320 at inference. According to an embodiment, swapping autoencoder model 300 extracts style embedding based on a style image. Sketch encoder 305 takes a sketch image as input and generates a sketch codebook based on the sketch image. The sketch codebook may also be referred to as a matrix of structure feature tokens. In some examples, a 16×16 grid may be processed in a sliding window fashion, i.e., predict a first 16×16 grid followed by shifting one column or row to predict the next 16×16 grid, etc.

According to an embodiment, during inference, machine learning model 320 generates the sketch codebook (i.e., sketch code word tokens). Machine learning model 320 then incorporates a feature vector (style, color, text, etc.) to generate the code words corresponding to a composite image (e.g., a stylized image). The code words corresponding to the composite image are then passed through an (RGB) image decoder to generate the final image. That is, style code word tokens (or style codebook) are not generated at inference. In some examples, machine learning model 320 unrolls and concatenates the sketch codebook into a vector (e.g., [6, 1, 3, 6, 7, . . . 6, 1, 3, 6, 12, 7, . . . 77]). That is, machine learning model 320 orders structure feature tokens of a matrix of structure feature tokens to obtain a sequence of structure feature tokens.

The style embedding (i.e., target style features) extracted from swapping autoencoder model 300 is inserted at the beginning of the vector to obtain a combined sequence of feature tokens. Machine learning model 320 combines the sequence of structure feature tokens with the target style features to obtain a combined sequence of feature tokens. The combined sequence of feature tokens is then input to transformer model 310. Transformer model 310 predicts tokens of a codebook (i.e., matrix of composite feature tokens 315) based on the combined sequence of feature tokens. Transformer model 310 generates output $$f_j(z) = \frac{e^{zj}}{\sum_k e^z k},$$

where z is the codebook index.

According to an embodiment, transformer model 310 performs next token prediction using the concatenated conditional and image tokens. Image tokens (0, n−1) are concatenated, token "Y" is predicted. At inference, machine learning model 320 makes token prediction indefinitely until machine learning model 320 exhausts all the locations.

Swapping autoencoder 300 is an example of, or includes aspects of, the corresponding element described with reference to FIGS. 2, 4, and 20. Sketch encoder 305 is an example of, or includes aspects of, the corresponding element described with reference to FIGS. 2, 18, and 20. Transformer model 310 is an example of, or includes aspects of, the corresponding element described with reference to FIGS. 2, 4, 14, and 20. Machine learning model 320 is an example of, or includes aspects of, the corresponding element described with reference to FIG. 2.

Figure 4:
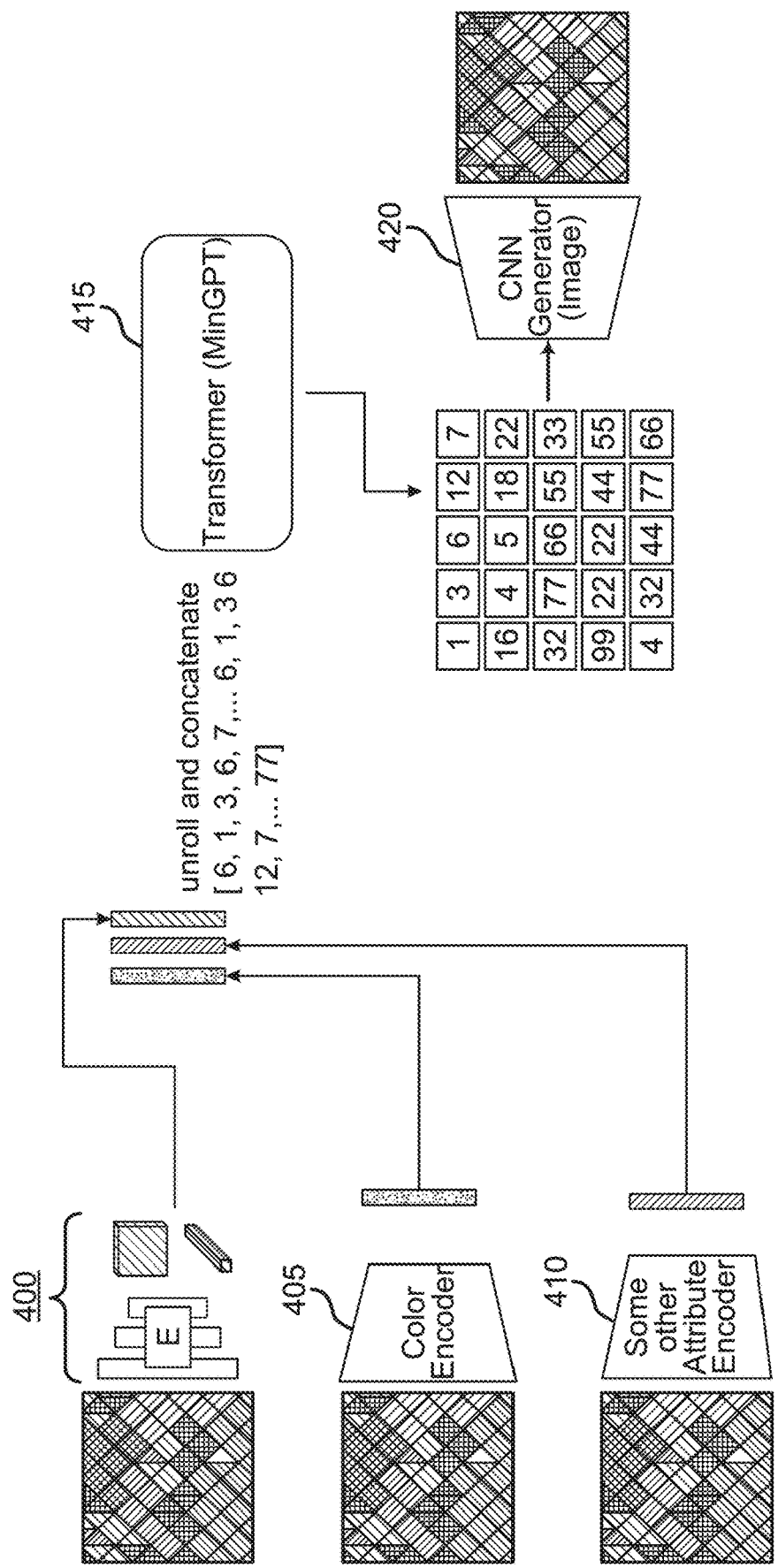
FIG. 4 shows an example of combined conditionings according to aspects of the present disclosure.

FIG. 4 shows an example of combined conditionings according to aspects of the present disclosure. The example shown includes swapping autoencoder model 400, color encoder 405, attribute encoder 410, transformer model 415, and image generator 420. According to an embodiment, multiple conditions are input to transformer model 415 that learns to pick up the best information. During inference, users can modify one of the conditionings and the machine learning model generate a new composite image. As shown in FIG. 4, swapping autoencoder model 400 extracts style embedding information from a style image. Color encoder 405 generates color representation based on a first input image. The first input image provides color conditioning. Attribute encoder 410 (an attribute encoder other than color encoder 405) generates attribute representation based on a second input image. The machine learning model unrolls and concatenates a sketch codebook into a vector. Color representation, attribute representation, and style embedding are inserted at the beginning of the vector to obtain a combined sequence of feature tokens. The combined sequence of feature tokens is input to transformer model 415 (e.g., generative pre-trained transformer or GPT). Transformer model 415 predicts feature tokens of a codebook (i.e., matrix of composite feature tokens) based on the combined sequence of feature tokens. The codebook is input to image generator 420 which generates a composite image. The composite image incorporates target style attributes from the style image, target color attributes from the first input image, and additional attributes from the second input image.

Swapping autoencoder model 400 is an example of, or includes aspects of, the corresponding element described with reference to FIGS. 2, 3, and 20. Color encoder 405 is an example of, or includes aspects of, the corresponding element described with reference to FIGS. 2 and 14. Transformer model 415 is an example of, or includes aspects of, the corresponding element described with reference to FIGS. 2, 3, 14, and 20. Image generator 420 is an example of, or includes aspects of, the corresponding element described with reference to FIGS. 2, 5, 18, and 19.

Figure 5:
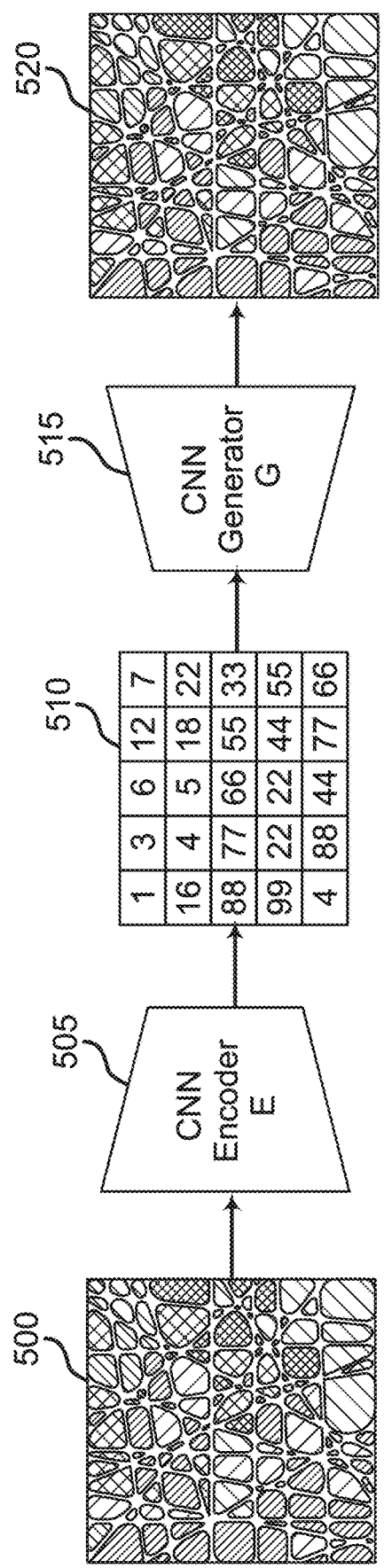
FIG. 5 shows an example of a vector quantized generative adversarial network according to aspects of the present disclosure.

FIG. 5 shows an example of a vector quantized generative adversarial network according to aspects of the present disclosure. The example shown includes image 500, image encoder 505, codebook 510, image generator 515, and reconstructed image 520.

According to an embodiment, an autoencoder model and a transformer model are configured to preform conditional prediction. In some examples, vector quantized variational autoencoder (VQ-VAE) is a type of variational autoencoder that uses vector quantization to obtain a discrete latent representation. Unlike variational autoencoder (VAE), the encoder network of VQ-VAE outputs discrete, rather than continuous, codes. The prior is learned rather than static. VQ-VAE is an autoencoder model. VQ-VAE learns to compress an image to a tokenized representation in a compressed space. In some cases, the autoencoder model and the transformer model are configured to generate background images (e.g., composite images).

According to an embodiment, VQ-VAE model is trained on RGB images collected from common keywords that display abstract background images. For example, keywords may include text "abstract background with square patterns." In some examples, the images can be repetitive patterns or artistic images that do not have distinct objects. VQ-VAE model compresses the image into a quantized codebook representation. The representations and the associated codebook embeddings are stored and codebook indices are used as tokens.

According to an embodiment, VQ-VAE model includes image encoder 505 and image generator 515. As shown in FIG. 5, image 500 is input to image encoder 505 that generates codebook 510. Codebook 510 is input to image generator 515 that generates reconstructed image 520.

According to some embodiments, image encoder 505 generates a matrix of supervision tokens for image 500. Image encoder 505 is an example of, or includes aspects of, the corresponding element described with reference to FIGS. 14, and 18-20. Image generator 515 is an example of, or includes aspects of, the corresponding element described with reference to FIGS. 2, 4, 18, and 19.

Image Generation

In FIGS. 6-16, a method, apparatus, and non-transitory computer readable medium for image processing are described. One or more embodiments of the method, apparatus, and non-transitory computer readable medium include identifying target style attributes and target structure attributes for a composite image; generating a matrix of composite feature tokens based on the target style attributes and the target structure attributes, wherein subsequent feature tokens of the matrix of composite feature tokens are sequentially generated based on previous feature tokens of the matrix of composite feature tokens according to a linear ordering of the matrix of composite feature tokens; and generating the composite image based on the matrix of composite feature tokens, wherein the composite image includes the target style attributes and the target structure attributes.

Some examples of the method, apparatus, and non-transitory computer readable medium further include generating target style features and dispensable structure features based on a style image that includes at least a portion of the target style attributes, wherein the target style features represent the target style attributes.

Some examples of the method, apparatus, and non-transitory computer readable medium further include identifying an additional style image. Some examples further include generating additional target style features based on the additional style image. Some examples further include combining the target style features and the additional target style features to obtain combined target style features, wherein the matrix of composite feature tokens is generated based on the combined target style features.

Some examples of the method, apparatus, and non-transitory computer readable medium further include identifying a spatial weighting for the style image and the additional style image, wherein the target style features and the additional target style features are combined based on the spatial weighting.

Some examples of the method, apparatus, and non-transitory computer readable medium further include selecting a color palette of a style image, wherein the color palette comprises color distribution information of the style image, and wherein the target style attributes include the color palette.

Some examples of the method, apparatus, and non-transitory computer readable medium further include receiving a grayscale image that includes the target structure attributes. Some examples further include generating a grayscale image embedding that represents the target structure attributes based on the grayscale image, wherein the matrix of composite feature tokens is generated based on the grayscale image embedding and the color palette.

Some examples of the method, apparatus, and non-transitory computer readable medium further include receiving a text query that specifies at least a portion of the target style attributes. Some examples further include generating a text embedding based on the text query, wherein the matrix of composite feature tokens is generated based on the text embedding.

Some examples of the method, apparatus, and non-transitory computer readable medium further include receiving a structure image that includes the target structure attributes. Some examples further include generating a sketch image of the structure image based on an edge detection model, wherein the sketch image includes the target structure attributes. Some examples further include generating a matrix of structure feature tokens based on the sketch image.

Some examples of the method, apparatus, and non-transitory computer readable medium further include ordering structure feature tokens of a matrix of structure feature tokens to obtain a sequence of structure feature tokens. Some examples further include combining the sequence of structure feature tokens with target style features to obtain a combined sequence of feature tokens, wherein the matrix of composite feature tokens is generated based on the combined sequence of feature tokens according to the linear ordering.

Some examples of the method, apparatus, and non-transitory computer readable medium further include identifying a row of the matrix of composite feature tokens. Some examples further include identifying a set of previous feature tokens in the row of the matrix of composite feature tokens. Some examples further include generating a next feature token in the row of the matrix of composite feature tokens based on the set of previous feature tokens in the row of the matrix of composite feature tokens.

Some examples of the method, apparatus, and non-transitory computer readable medium further include identifying a row of the matrix of structure feature tokens corresponding to the row of the matrix of composite feature tokens, wherein the next feature token is generated based on the row of the matrix of structure feature tokens.

In some examples, the next feature token in the row of the matrix of composite feature tokens is generated independently of a previous row in the matrix of composite feature tokens. In some examples, each composite feature token of the matrix of composite feature tokens represents a vector from a vector quantized generative adversarial network (VQGAN) codebook. In some examples, the target style attributes include color information, texture information, lighting information, high frequency information, or any combination thereof.

Figure 6:
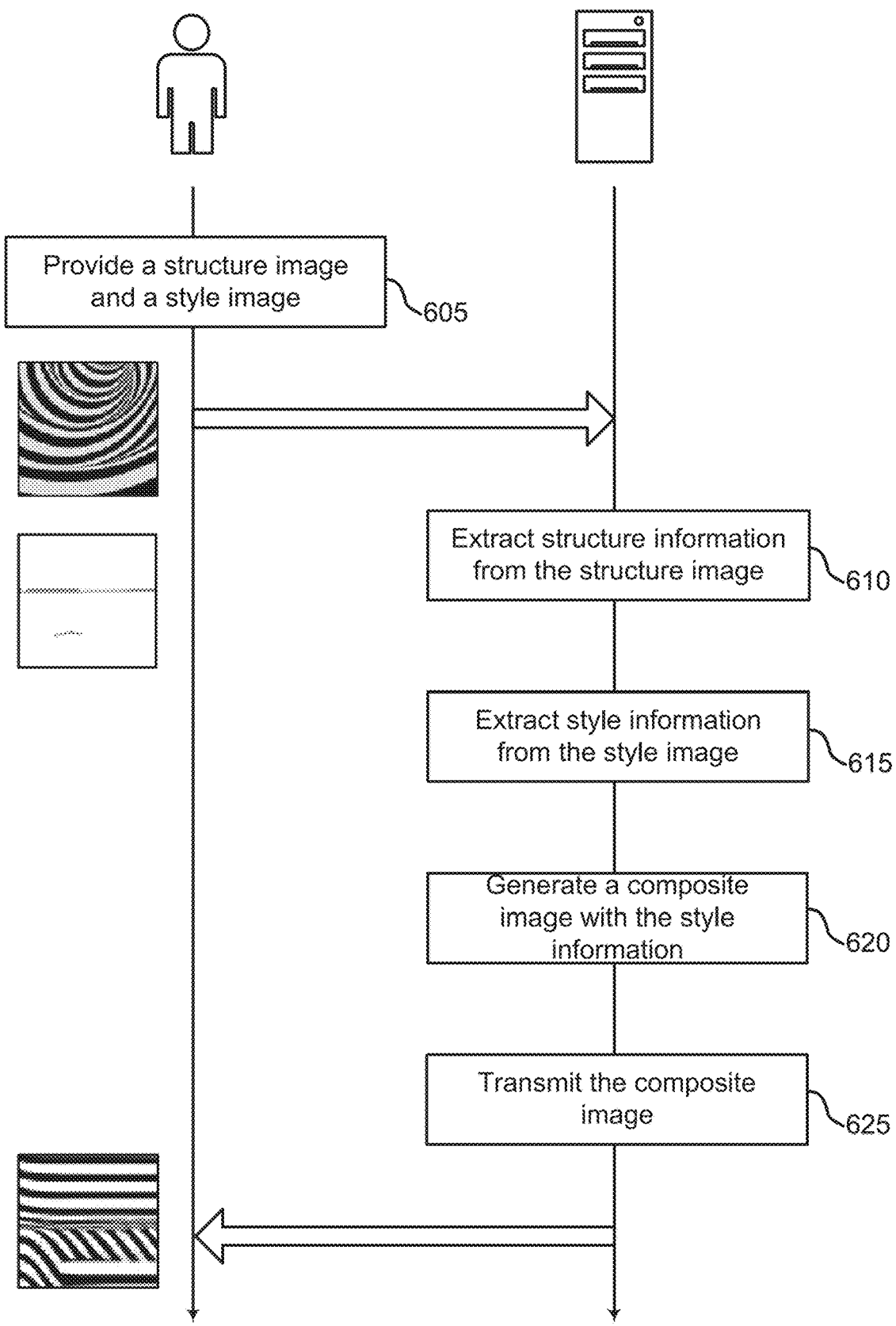
FIG. 6 shows an example of a method for image generation application according to aspects of the present disclosure.

FIG. 6 shows an example of image generation application according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the user provides a structure image and a style image. In some cases, the operations of this step refer to, or may be performed by, a user via a user device as described with reference to FIG. 1. In some examples, a structure image includes target structure attributes while a style image includes target style attributes.

At operation 610, the system extracts structure information from the structure image. In some cases, the operations of this step refer to, or may be performed by, an image generation apparatus as described with reference to FIGS. 1 and 2. In some examples, an edge detection model generates a sketch image of a structure image. That is, the edge detection model converts the structure image into sketch representation that captures the distribution or style of the sketch particular to the structure image. The sketch image identifies the predominant structure of the structure image.

At operation 615, the system extracts style information from the style image. In some cases, the operations of this step refer to, or may be performed by, an image generation apparatus as described with reference to FIGS. 1 and 2. In some examples, a swapping autoencoder model disentangles an image into structure code and style code in its intermediate latent representation. The structure code defines the overall structure of the image, i.e., capturing aspects such as hard and soft edges. The style code encapsulates the fine detail and recurring patterns in the image including color, texture, lighting, and high frequency details. The style code extracted using the swapping autoencoder model is the style information to be used in subsequent steps.

At operation 620, the system generates a composite image with the style information. In some cases, the operations of this step refer to, or may be performed by, an image generation apparatus as described with reference to FIGS. 1 and 2. The composite image includes the target style attributes of the style image and the target structure attributes of the sketch image.

At operation 625, the system transmits the composite image to the user. In some cases, the operations of this step refer to, or may be performed by, an image generation apparatus as described with reference to FIGS. 1 and 2.

Figure 7:
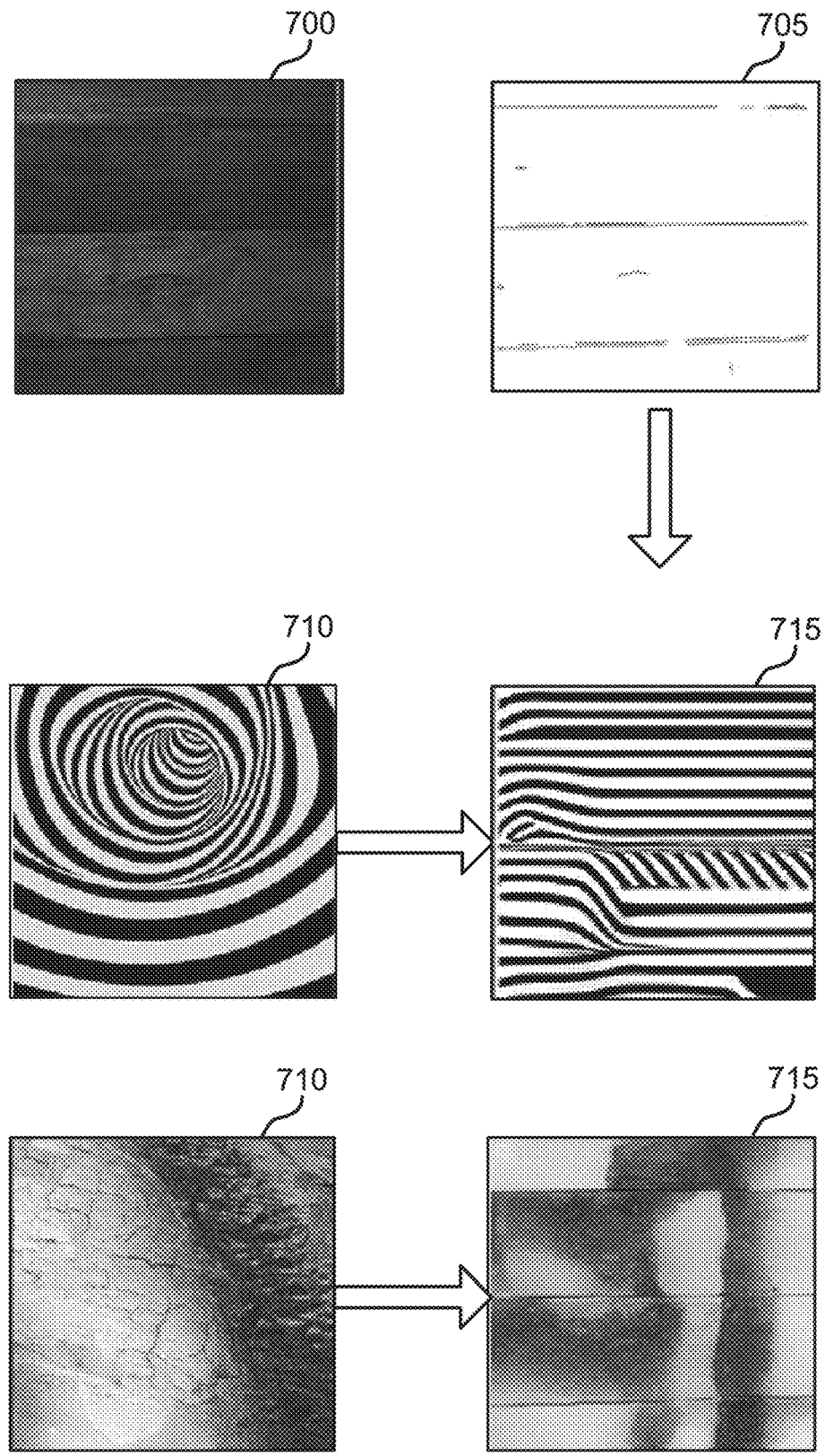
FIG. 7 shows an example of style conditioning according to aspects of the present disclosure.

FIG. 7 shows an example of style conditioning according to aspects of the present disclosure. Machine learning model 225 as shown in FIG. 2 performs style conditioning. The example shown includes structure image 700, sketch image 705, style image 710, and composite image 715. In an embodiment, an edge detection model generates sketch image 705 based on structure image 700, where sketch image 705 preserves structural information such as edges of structure image 700. Sketch image 705 includes target structure attributes. Structure image 700 is an example of, or includes aspects of, the corresponding element described with reference to FIGS. 1, 9, and 18. Sketch image 705 is an example of, or includes aspects of, the corresponding element described with reference to FIGS. 8, 15, 16, 18, and 20.

According to an embodiment, machine learning model 225 generates composite image 715 which includes target style attributes of style image 710. That is, a generated image is grounded in the style of the style cue image (i.e., style image 710). Different style embeddings can be used to create a variety of composite images at inference. Adding sketching and detail to the sketch conditioning enables grounding the generated image in the structure of another image. Accordingly, the structure of composite image 715 is kept constant. For example, machine learning model 225 generates multiple images having a fixed structure by keeping the edge of an input image constant during style conditioning. Style image 710 is an example of, or includes aspects of, the corresponding element described with reference to FIGS. 1 and 20. Composite image 715 is an example of, or includes aspects of, the corresponding element described with reference to FIGS. 1, 8-10, 15, and 16.

Figure 8:
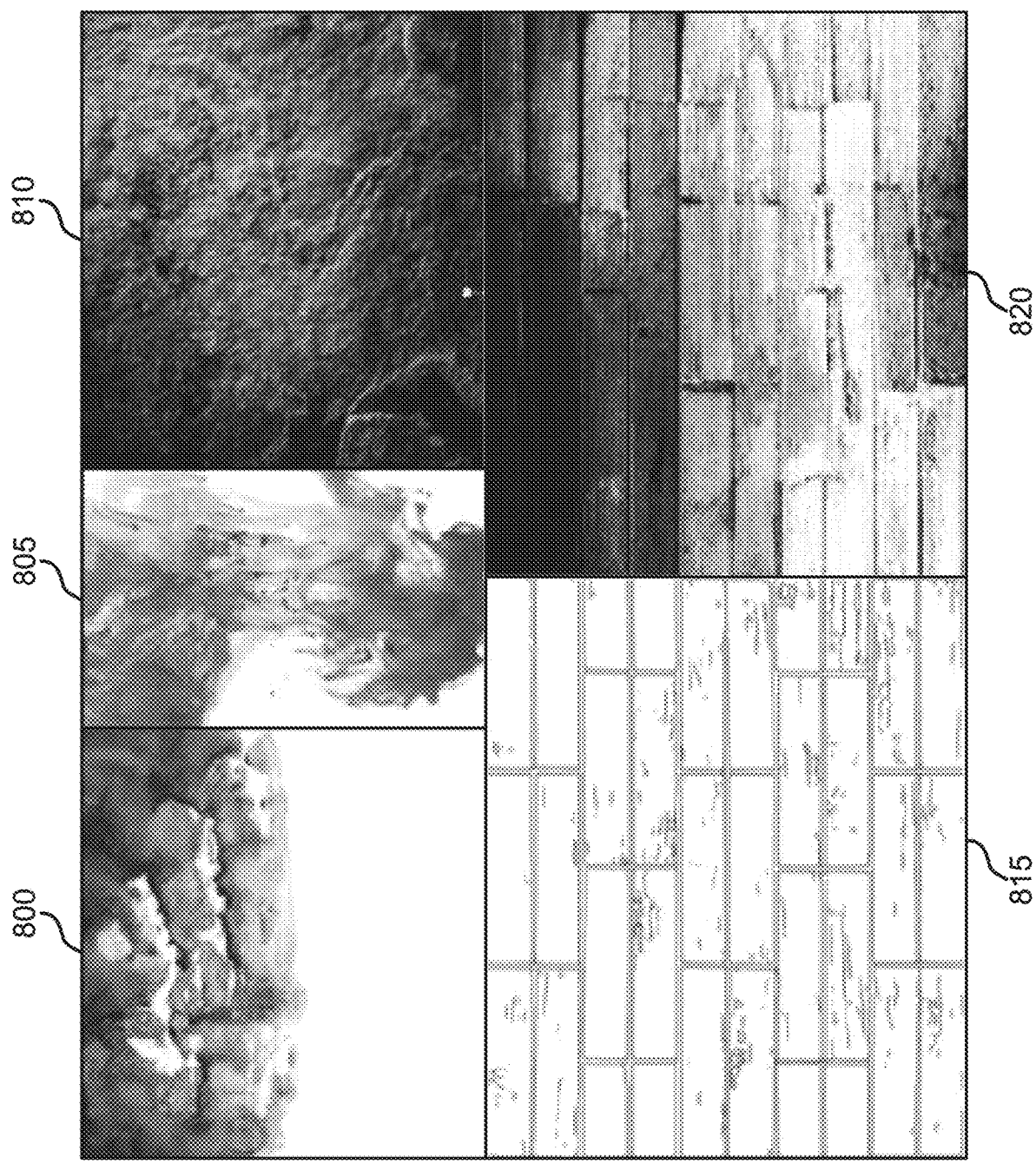
FIG. 8 shows an example of multiple style conditioning according to aspects of the present disclosure.

FIG. 8 shows an example of multiple style conditioning according to aspects of the present disclosure. The example shown includes first style image 800, second style image 805, third style image 810, sketch image 815, and composite image 820. The SAE style embedding can be mixed between multiple images. As an example shown in FIG. 8, machine learning model 225 takes SAE embeddings from multiple images (i.e., first style image 800, second style image 805, third style image 810) and their average embeddings act as a style. That is, a machine learning model 225 generates a background image (i.e., composite image 820) using a set of style images as style conditioning. In some cases, multiple style conditioning can be performed to generate composite image 820 that represents the style and sketch conditioning images, where the sketch conditioning is from sketch image 815. In some cases, an edge detection model converts a structure image to sketch image 815, where sketch image 815 includes a set of target structure attributes. The style or style embedding corresponding to each of conditioning images (i.e., first style image 800, second style image 805, third style image 810) can be weighed independently. Sketch image 815 is an example of, or includes aspects of, the corresponding element described with reference to FIGS. 7, 15, 16, 18, and 20. Composite image 820 is an example of, or includes aspects of, the corresponding element described with reference to FIGS. 1, 7, 9, 10, 15, and 16.

Figure 9:
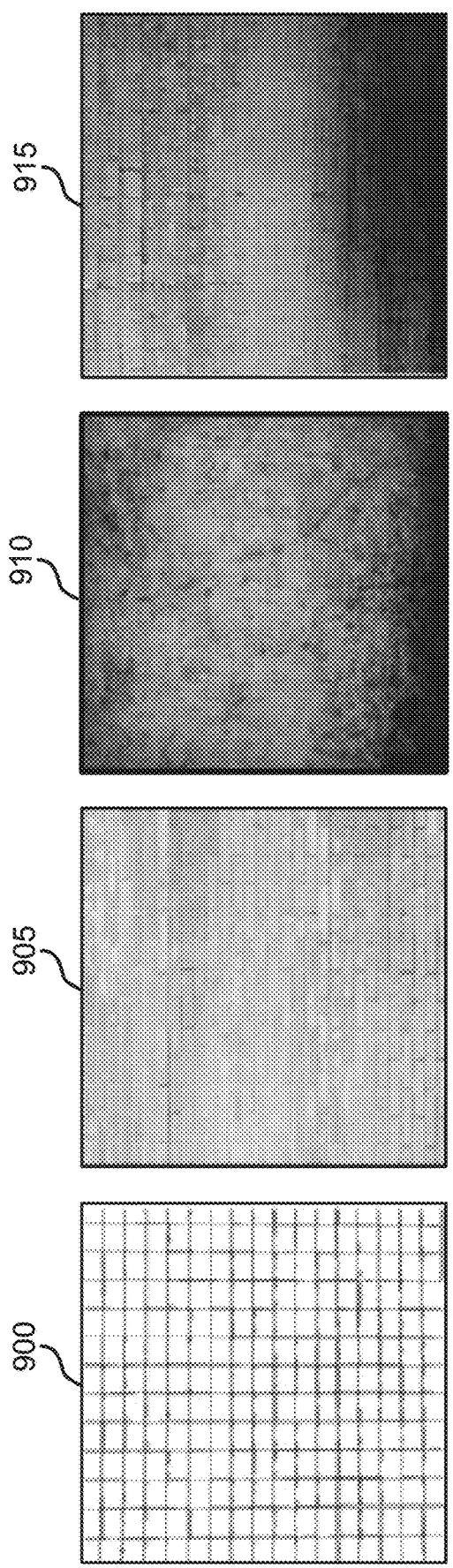
FIG. 9 shows an example of spatial mixing of styles according to aspects of the present disclosure.

FIG. 9 shows an example of spatial mixing of styles according to aspects of the present disclosure. The example shown includes structure image 900, first style image 905, second style image 910, and composite image 915. According to an embodiment, machine learning model 225 is configured to mix styles from multiple style images spatially and generate composite image 915 based on spatial mixing of styles. Different style embeddings are applied to different parts of a generated image because the transformer model generates parts sequentially. In some cases, mixed style features can be extended to produce a style brush where users edit a blank canvas with style strokes or mix styles like a paint brush. As an example shown in FIG. 9, structure image 900 is a sketch-conditioning image that defines the structure. First style image 905 and second style image 910 may be used as style-conditioning images at different locations of the generated image, i.e., spatial mixing of styles. Style from first style image 905 is applied to top half of composite image 915 and style from second style image 910 is applied to the bottom half of composite image 915. That is, first style image 905 is used as style condition for a first area of composite image 915. Second style image 910 is used as style condition for a second area of composite image 915. Embodiments of the present disclosure are not limited to spatial mixing of two styles. Structure image 900 is an example of, or includes aspects of, the corresponding element described with reference to FIGS. 1, 7, and 18. Composite image 915 is an example of, or includes aspects of, the corresponding element described with reference to FIGS. 1, 7, 8, 10, 15, and 16.

Figure 10:
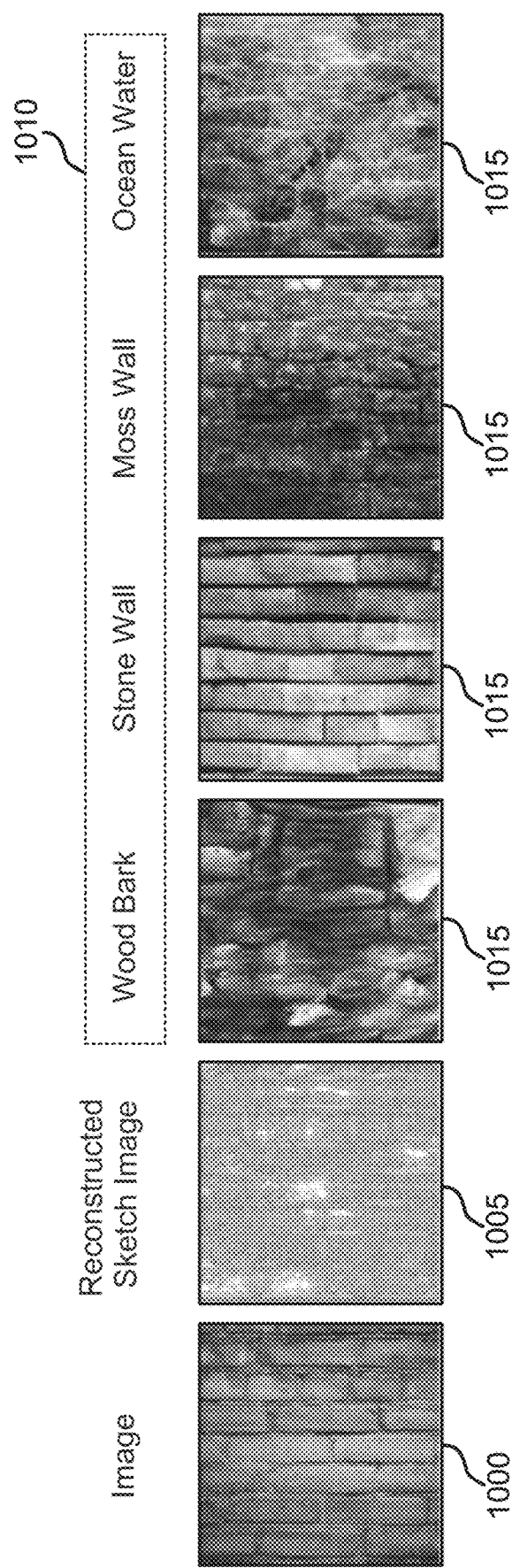
FIG. 10 shows an example of sketch and text CLIP conditioning according to aspects of the present disclosure.

FIG. 10 shows an example of sketch and text CLIP conditioning according to aspects of the present disclosure. The example shown includes image 1000, reconstructed sketch image 1005, text query 1010, and composite image 1015. Machine learning model 225 makes use of another feature vector which is a multi-modal embedding trained using image-caption pairs. In some cases, machine learning model 225 is trained based on a loss function that gets both modalities close to its counterpart. In some examples, contrastive language-image pre-training (CLIP) model can extract the common embeddings for images and captions. When training the transformer model, the transformer model takes the CLIP embedding of the original image, the sketch condition, and the incomplete image indices as input. The transformer model learns to predict the next index. Therefore, CLIP embedding of another image or a description is input to the transformer model during inference and the transformer model adheres to its semantics.

As an example shown in FIG. 10, a user provides image 1000 via user interface and image 1000 is a query image of a brick background. Machine learning model 225 converts image 1000 to its corresponding sketch image (i.e., reconstructed sketch image 1005). Using reconstructed sketch image 1005 as condition and CLIP embeddings of descriptions like "wood bark", machine learning model 225 obtains composite image 1015 (third image from the left). Composite image 1015 follows the structure of the brick background image but looks more like a bark of a tree. In another example, the description is "stone wall". CLIP embeddings of descriptions "stone wall" is input to machine learning model 225, which then generates composite image 1015 (fourth image from the left). Composite image 1015 follows the structure of the brick background image but looks similar to a stone wall. Image 1000 is an example of, or includes aspects of, the corresponding element described with reference to FIG. 5. Composite image 1015 is an example of, or includes aspects of, the corresponding element described with reference to FIGS. 1, 7-9, 15, and 16.

Figure 11:
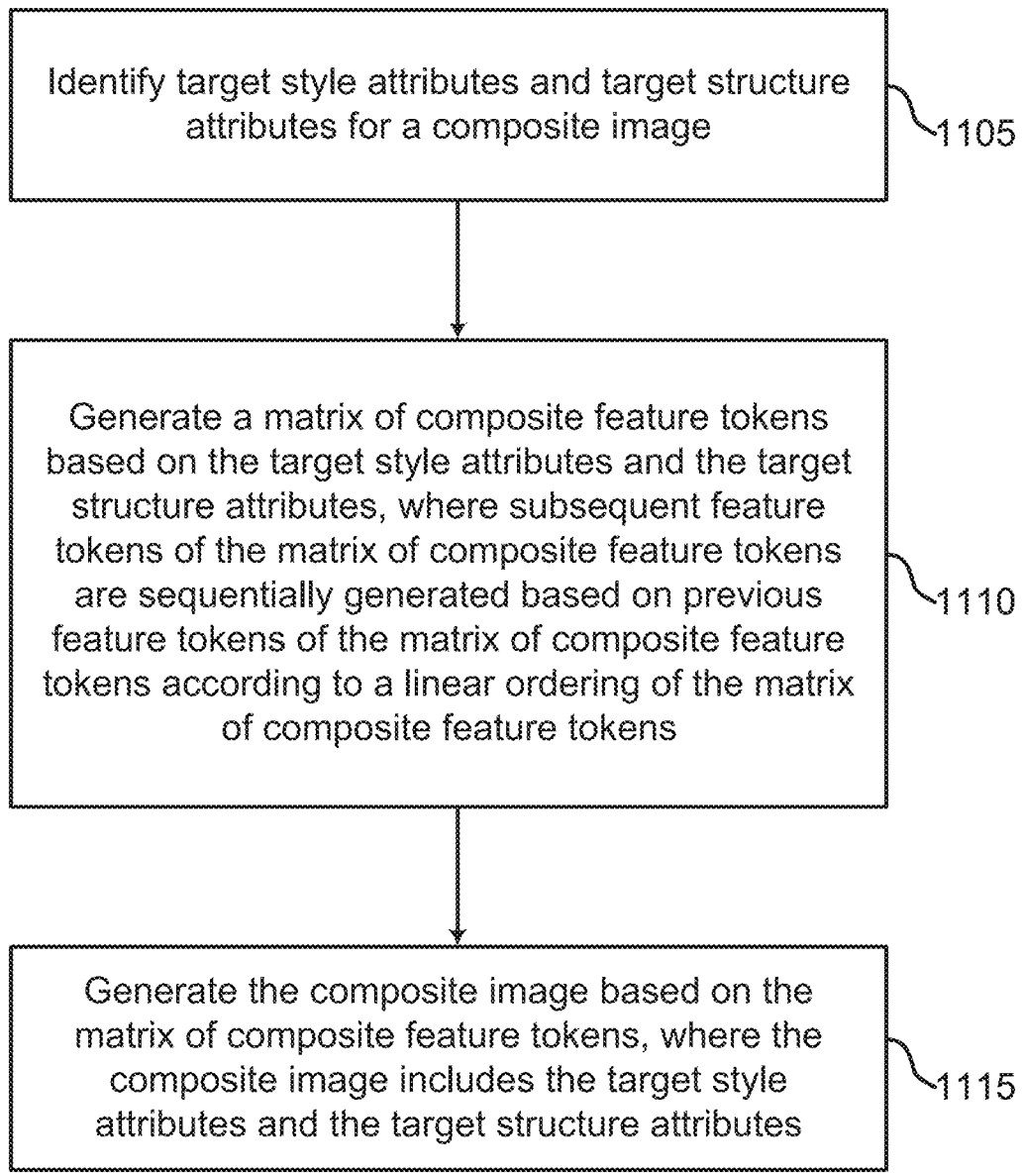
FIG. 11 shows an example of a method for image generation according to aspects of the present disclosure.

FIG. 11 shows an example of a method for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system identifies target style attributes and target structure attributes for a composite image. In some cases, the operations of this step refer to, or may be performed by, a machine learning model as described with reference to FIGS. 2 and 3. In some examples, a user uploads a structure image and a style image to machine learning model 225 as shown in FIG. 2. The structure image includes the target structure attributes (e.g., distribution of edges). The style image includes the target style attributes (e.g., color, texture, lighting, or other high frequency information).

At operation 1110, the system generates a matrix of composite feature tokens based on the target style attributes and the target structure attributes, where subsequent feature tokens of the matrix of composite feature tokens are sequentially generated based on previous feature tokens of the matrix of composite feature tokens according to a linear ordering of the matrix of composite feature tokens. In some cases, the operations of this step refer to, or may be performed by, a transformer model as described with reference to FIGS. 2-4, 14, and 20.

According to some embodiments, the transformer model is configured to predict encoded representations of an image conditioned on prior predictions, sketch/structure, a style, and/or color information. In some cases, a pre-trained style embedding from a swapping autoencoder model capture the style of a style image or a color histogram-based embedding. In some examples, the color embeddings capture the color palette distribution of a style image that is disentangled from the structure code.

According to an embodiment, the transformer model is trained in an unsupervised manner. Style embeddings from SAE model or color embeddings are used as cue and are input to the transformer model at training. In some examples, the transformer model is an autoregressive transformer such as generative pre-trained transformer (GPT). The transformer model is trained on the same dataset as conditioning to predict masked regions of an image. The style or color cues are absorbed by the transformer model during training. The transformer model generates an image autoregressively (one block of pixels at a time). That is, the transformer model adds randomness to its predictions such that the transformer model outputs diverse variations of the input style or color palette. The structure (represented by a sketch image) on a canvas further guides the structure of the composite image while maintaining the style or color as represented in corresponding style embeddings or color embeddings.

At operation 1115, the system generates the composite image based on the matrix of composite feature tokens, where the composite image includes the target style attributes and the target structure attributes. In some cases, the operations of this step refer to, or may be performed by, an image generator as described with reference to FIGS. 2, 4, 5, 18, and 19.

Figure 12:
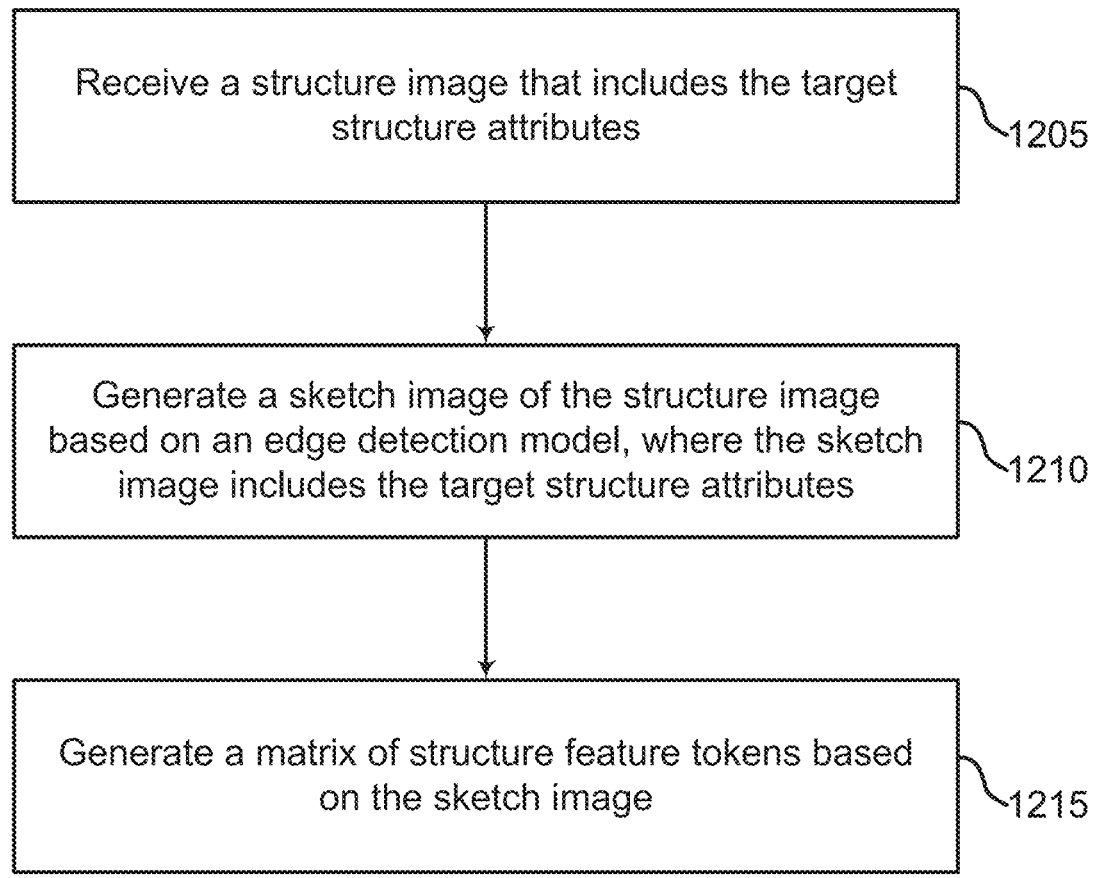
FIG. 12 shows an example of a method for generating a matrix of structure feature tokens according to aspects of the present disclosure.

FIG. 12 shows an example of a method for generating a matrix of structure feature tokens according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system receives a structure image that includes the target structure attributes. In some cases, the operations of this step refer to, or may be performed by, an edge detection model as described with reference to FIG. 2.

At operation 1210, the system generates a sketch image of the structure image based on an edge detection model, where the sketch image includes the target structure attributes. In some cases, the operations of this step refer to, or may be performed by, an edge detection model as described with reference to FIG. 2. A VQ-VAE is trained on sketches of images. In some examples, an edge detection model converts the structure image into a sketch representation that captures the distribution or style of the sketches particular to the structure image. Sketch representation (or a sketch image) identifies the predominant structure of the structure image.

At operation 1215, the system generates a matrix of structure feature tokens based on the sketch image. In some cases, the operations of this step refer to, or may be performed by, a sketch encoder as described with reference to FIGS. 2, 3, 18, and 20. A sketch encoder is configured to generate a matrix of structure feature tokens based on the sketch image. In some cases, the matrix of structure feature tokens may be referred to as a sketch codebook.

Figure 13:
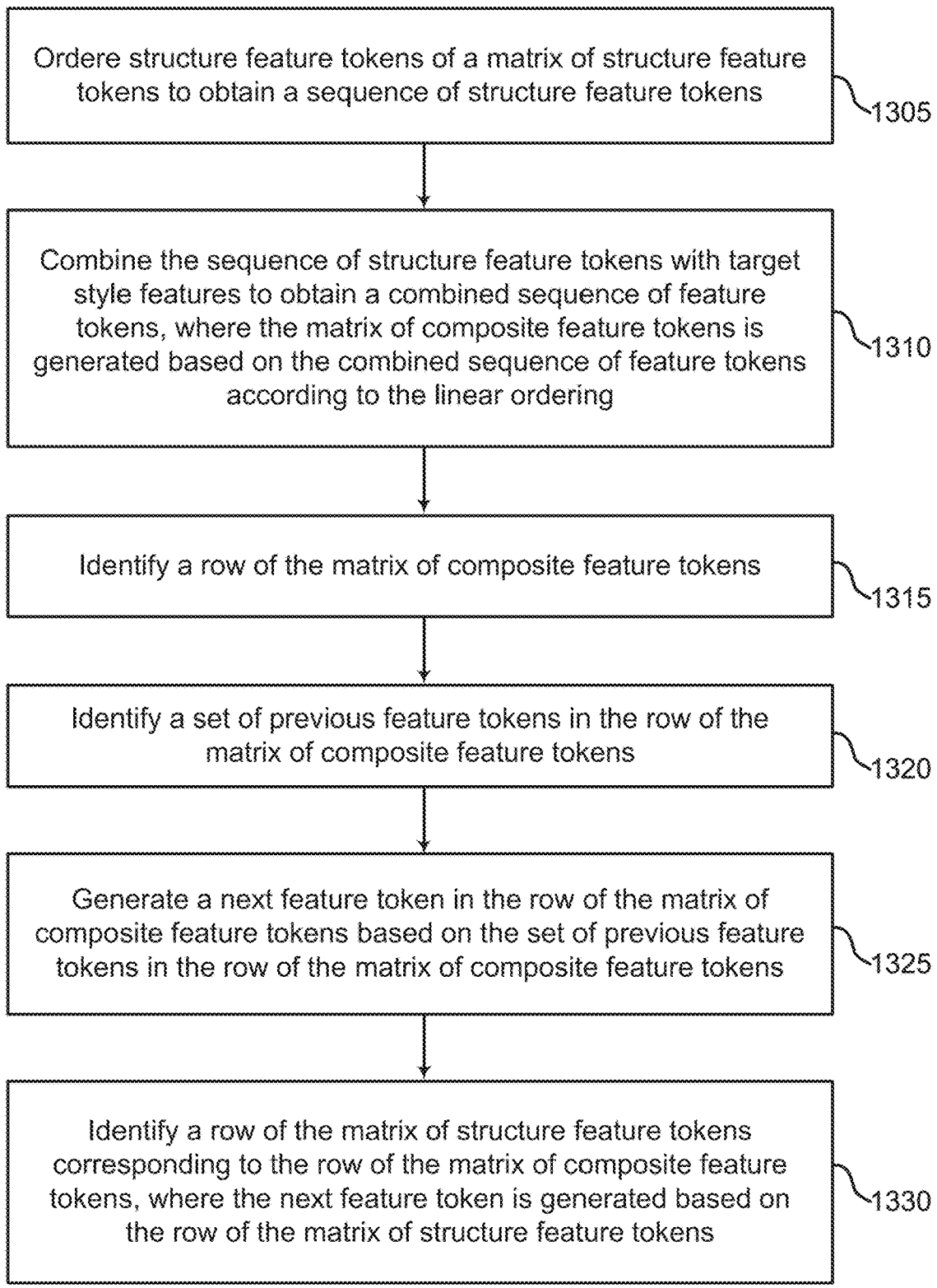
FIG. 13 shows an example of a method for generating a next feature token according to aspects of the present disclosure.

FIG. 13 shows an example of a method for generating a next feature token according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the system orders structure feature tokens of a matrix of structure feature tokens to obtain a sequence of structure feature tokens. In some cases, the operations of this step refer to, or may be performed by, a transformer model as described with reference to FIGS. 2-4, 14, and 20.

At operation 1310, the system combines the sequence of structure feature tokens with target style features to obtain a combined sequence of feature tokens, where the matrix of composite feature tokens is generated based on the combined sequence of feature tokens according to the linear ordering. In some cases, the operations of this step refer to, or may be performed by, a transformer model as described with reference to FIGS. 2-4, 14, and 20.

At operation 1315, the system identifies a row of the matrix of composite feature tokens. In some cases, the operations of this step refer to, or may be performed by, a transformer model as described with reference to FIGS. 2-4, 14, and 20.

At operation 1320, the system identifies a set of previous feature tokens in the row of the matrix of composite feature tokens. In some cases, the operations of this step refer to, or may be performed by, a transformer model as described with reference to FIGS. 2-4, 14, and 20.

At operation 1325, the system generates a next feature token in the row of the matrix of composite feature tokens based on the set of previous feature tokens in the row of the matrix of composite feature tokens. In some cases, the operations of this step refer to, or may be performed by, a transformer model as described with reference to FIGS. 2-4, 14, and 20.

At operation 1330, the system identifies a row of the matrix of structure feature tokens corresponding to the row of the matrix of composite feature tokens, where the next feature token is generated based on the row of the matrix of structure feature tokens. In some cases, the operations of this step refer to, or may be performed by, a transformer model as described with reference to FIGS. 2-4, 14, and 20.

Figure 14:
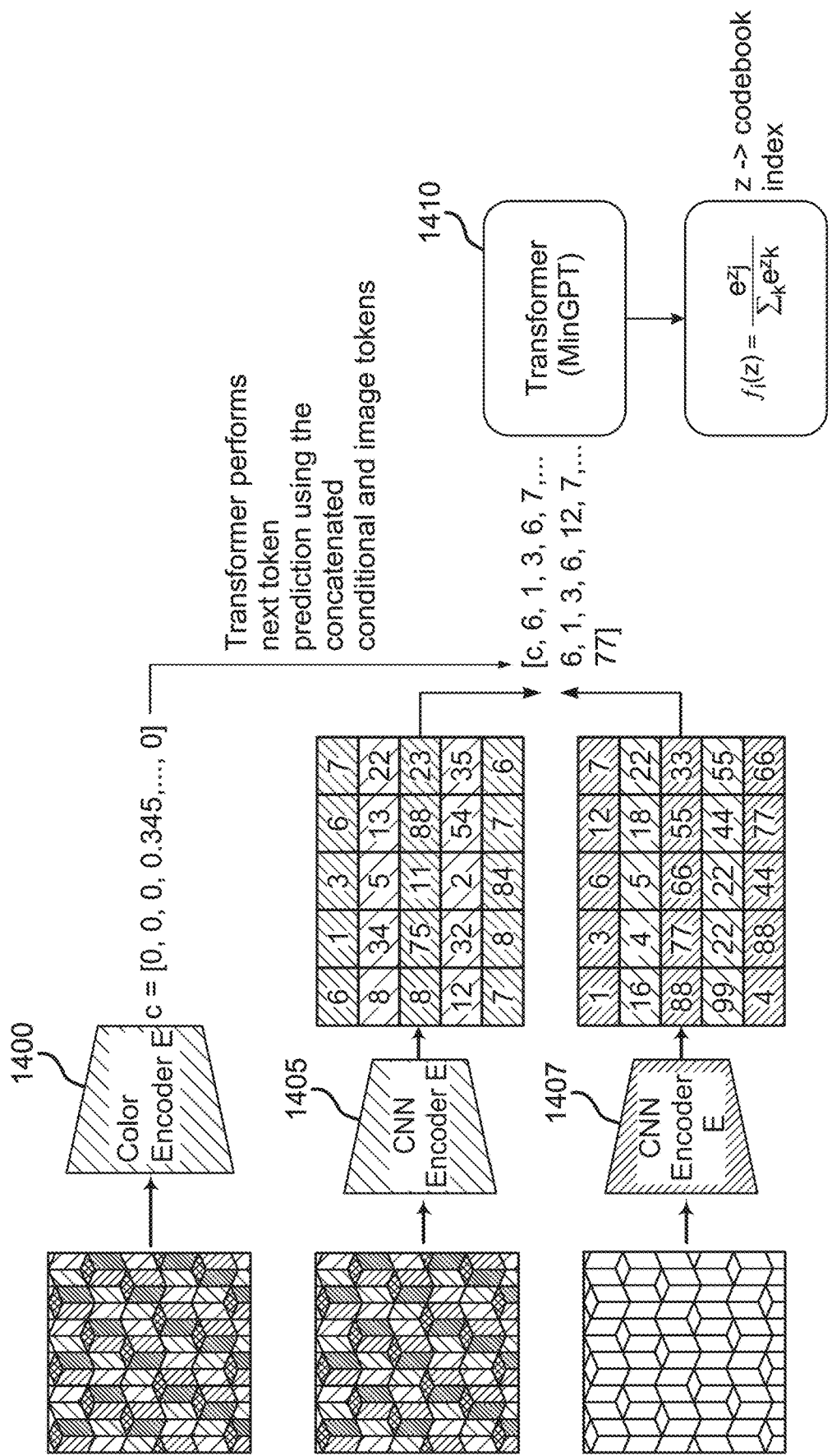
FIG. 14 shows an example of color embedding conditioning and grayscale conditioning for image re-colorization according to aspects of the present disclosure.

FIG. 14 shows an example of color embedding conditioning and grayscale conditioning for image re-colorization according to aspects of the present disclosure. The example shown includes color encoder 1400, image encoder 1405, sketch encoder 1407, and transformer model 1410. Machine learning model 225 applies similar operations as in the style cue. Machine learning model 225 provides color cue as the first input to transformer model 1410 at training. In some examples, the dataset is augmented by randomly varying the brightness, contrast, saturation, and hue to increase the quality of results. This way, the codebook has richer diversity information and biases related to certain structures are mitigated.

According to an embodiment, color encoder 1400 generates a color feature vector c. Image encoder 1405 generates an image codebook. Sketch encoder 1407 generates a sketch codebook. The machine learning model orders image feature tokens in the image codebook to obtain a sequence of image feature tokens. The machine learning model orders structure feature tokens of the sketch codebook (i.e., a matrix of structure feature tokens) to obtain a sequence of structure feature tokens. The machine learning model combines the sequence of image feature tokens, the sequence of structure feature tokens, and the color feature vector to obtain a combined sequence of feature tokens. The color feature vector c is positioned at the beginning of the combined sequence of feature tokens. The combined sequence of feature tokens is input to transformer model 1410 which predicts tokens of a codebook (i.e., a matrix of composite feature tokens as shown in FIG. 3) based on the combined sequence of feature tokens. Transformer model 310 generates output $$f_j(z) = \frac{e^{z_j}}{\sum_k e^{z_k}},$$

where z is the codebook index.

Transformer model 1410 performs next token prediction using the concatenated conditional and image tokens. In some examples, a histogram-based feature vector derived from a LAB space is used for color embedding. The color feature vectors lead to convenient color palette picking and visualization. In some cases, the color embedding dimension is checked and adjusted to match the image and structure (i.e., sketch) condition input dimensions. In some examples, the color embedding dimension is 1024 in size. Therefore, a 3D histogram space of 10×10×10 bins is created to obtain a color embedding size of 1000. Machine learning model pads this with 0's of dimension 24 resulting in a color embedding of dimension 1024. The color embedding is a histogram-based feature vector, hence the target colors from the 1000 color bins are provided during inference by making the values set to 1.0 and rest remain 0.0.

According to an embodiment, sketch encoder 1407 is replaced with a grayscale encoder. Another VQGAN is trained to reconstruct grayscale images. In some cases, the codebook, encoder, and the color embedding of the VQGAN model may be used to retrain transformer model 1410 to recolor the grayscale inputs. Additionally, transformer model 1410 performs next token prediction using the concatenated conditional and image tokens generated from the CNN encoders. This way, users generate a composite image keeping the color shades and lightness into account (preserve color attributes and light attributes) while recoloring them. According to an embodiment, the grayscale image is processed in a similar fashion as the operation of using sketch (structure) images as described in FIG. 3. In some cases, color palette feature is processed in a similar fashion as SAE style embedding as shown in FIGS. 3-4. The color palette feature (1)+code words from the grayscale image (256) is used to generate the code word matrix for a new colored image (i.e., the composite image).

Color encoder 1400 is an example of, or includes aspects of, the corresponding element described with reference to FIGS. 2 and 4. Image encoder 1405 is an example of, or includes aspects of, the corresponding element described with reference to FIGS. 5, and 18-20. Transformer model 1410 is an example of, or includes aspects of, the corresponding element described with reference to FIGS. 2-4, and 20.

Figure 15:
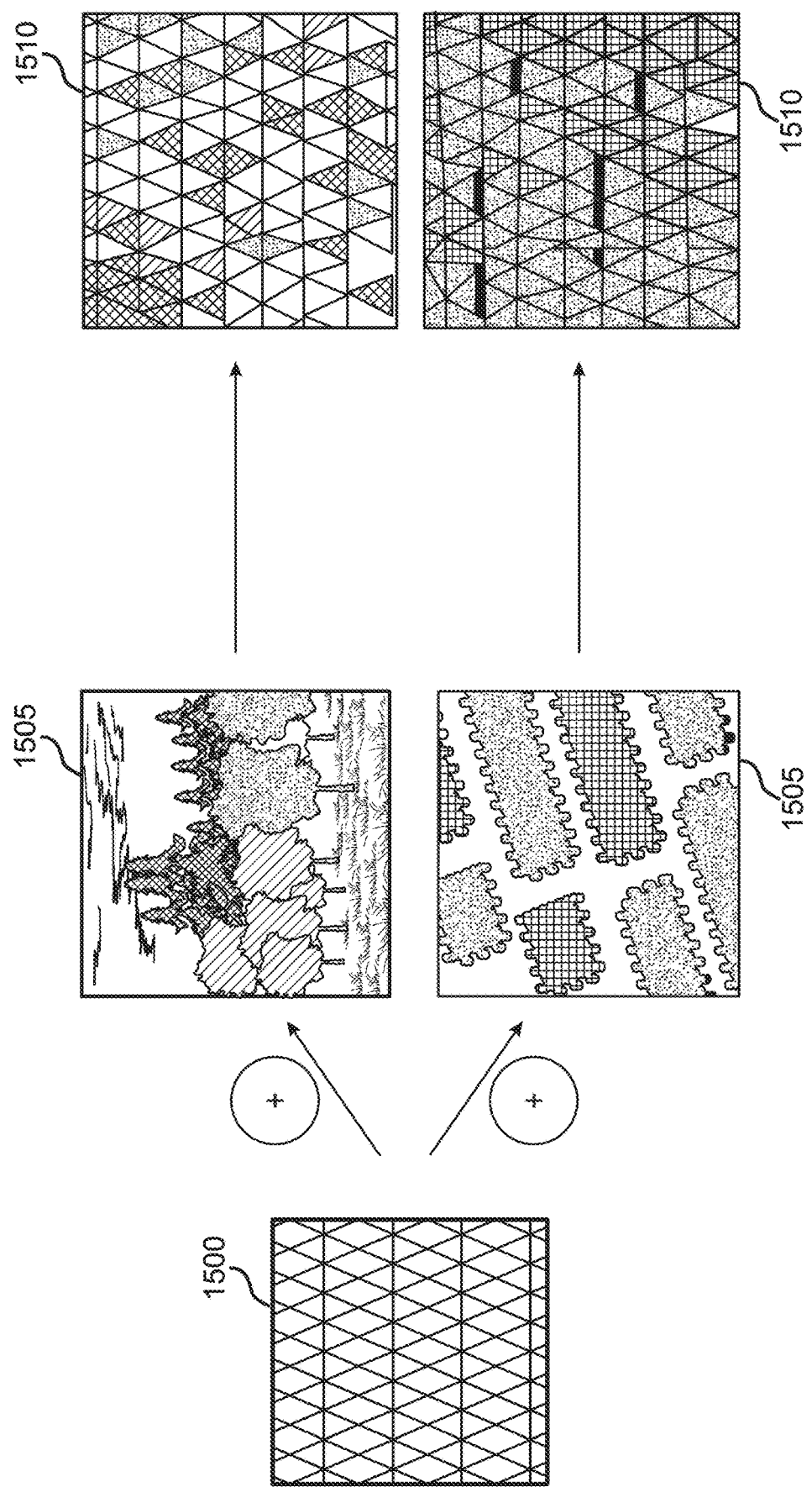
FIG. 15 shows an example of sketch and image color palette conditioning according to aspects of the present disclosure.

FIG. 15 shows an example of sketch and image color palette conditioning according to aspects of the present disclosure. The example shown includes sketch image 1500, color palette 1505, and composite image 1510. In some examples, machine learning model 225 takes sketch image 1500 and color palette 1505 of another image as input at inference and generates composite image 1510. Sketch image 1500 is combined with an image color-palette condition to generate composite image 1510, where composite image 1510 includes target structure attributes of sketch image 1500 and color attributes from the another image. Referring to FIG. 15, color palette 1505 at the top row has three different colors indicated by three different shading patterns (see shades of the trees). Accordingly, colors or color patterns in composite image 1510 at the top depend on colors depicted in color palette 1505. Similarly, colors or color patterns in composite image 1510 at the bottom depend on colors of color palette 1505 at the bottom (color palette 1505 has two colors indicated by two different shading patterns). In some examples, color palette 1505 can be used as the color cue. Sketch image 1500 is an example of, or includes aspects of, the corresponding element described with reference to FIGS. 7, 8, 16, 18, and 20.

Composite image 1510 is an example of, or includes aspects of, the corresponding element described with reference to FIGS. 1, 7-10, and 16.

Figure 16:
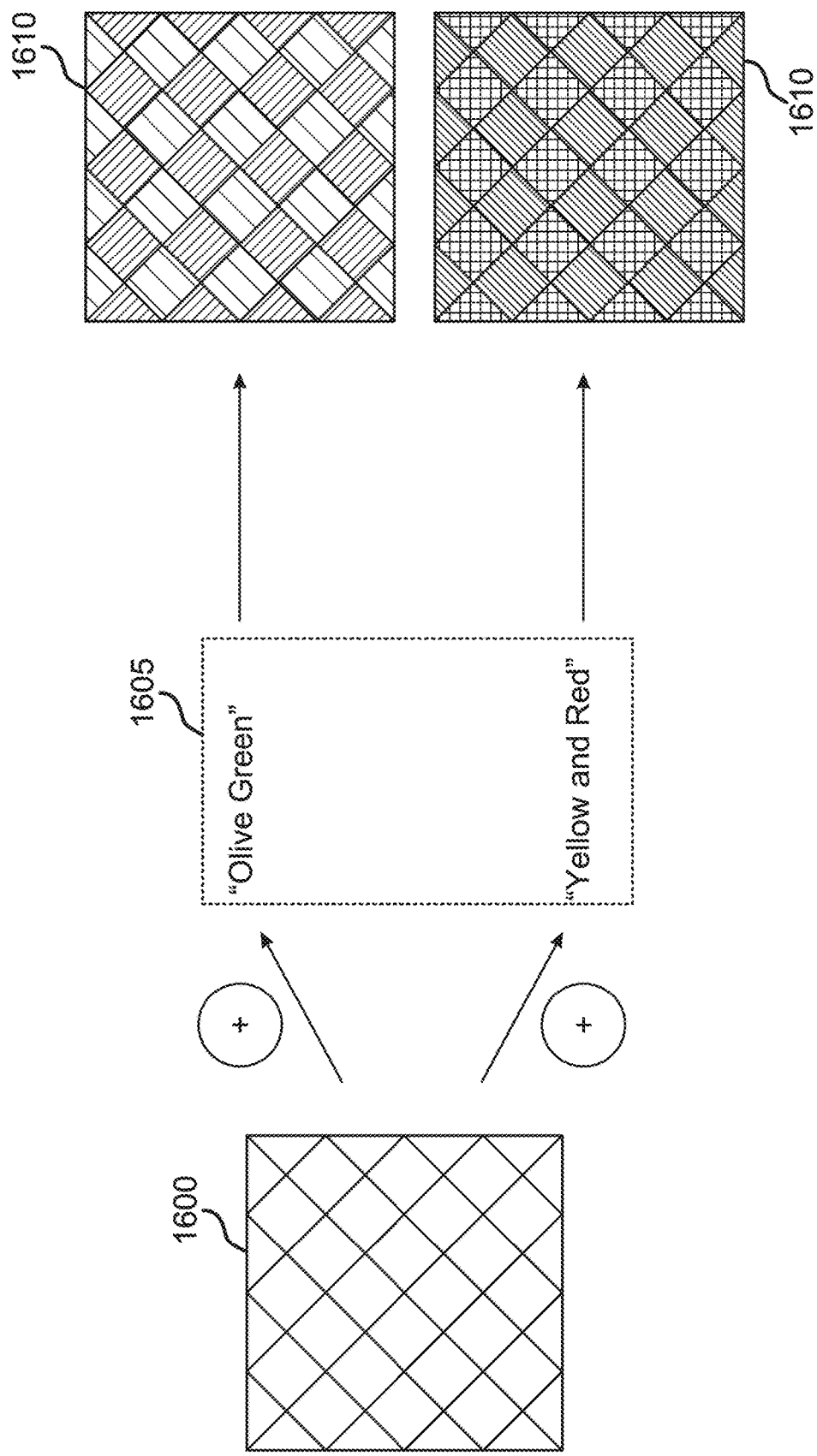
FIG. 16 shows an example of sketch and text color palette conditioning according to aspects of the present disclosure.

FIG. 16 shows an example of sketch and text color palette conditioning according to aspects of the present disclosure. The example shown includes sketch image 1600, color phrase 1605, and composite image 1610. According to an embodiment, a text encoder converts text into color embedding, i.e., text color palette conditioning. In some cases, a network model is trained such that the model converts text into a color embedding, where the color embedding is in the same feature space as the transformer model is trained on.

According to an embodiment, the sketch and text color palette conditioning can be performed using metric learning method. In some examples, the metric learning method converts multi-lingual text into color embedding by converting text into its corresponding cross-lingual embeddings (e.g., multi-lingual USE). So along with the sketch condition, a user can provide the first input to the transformer model as color input by providing color phrase 1605. In some examples, the user provides color phrase 1605 such as "olive green" or "yellow and red", composite image 1610 follows the structure from sketch image 1600 and also includes colors or color patterns as indicated by color phrase 1605 ("olive green"). That is, machine learning model 225 generates composite image 1610 that contains olive green color. Sketch image 1600 is an example of, or includes aspects of, the corresponding element described with reference to FIGS. 7, 8, 15, 18, and 20. Composite image 1610 is an example of, or includes aspects of, the corresponding element described with reference to FIGS. 1, 7-10, and 15.

Training and Evaluation

In FIGS. 17-20, a method, apparatus, and non-transitory computer readable medium for training a machine learning model are described. One or more embodiments of the method, apparatus, and non-transitory computer readable medium include generating style features of an image using a swapping autoencoder (SAE) model; generating a sketch image from the image using an edge detection model; generating a matrix of structure feature tokens based on the sketch image using a sketch encoder; generating a matrix of composite feature tokens based on the style features of the image and the matrix of structure feature tokens using a transformer model, wherein subsequent feature tokens of the matrix of composite feature tokens are sequentially generated based on previous feature tokens of the matrix of composite feature tokens according to a linear ordering of the matrix of composite feature tokens; generating a matrix of supervision tokens for the image using an image encoder; computing a classification loss based on the matrix of composite feature tokens and the matrix of supervision tokens, wherein each supervision token of the matrix of supervision tokens is selected from a pre-determined collection of tokens; and updating parameters of the transformer model based on the classification loss. In some examples, a classification loss is used to train the transformer model to predict the next token from a fixed vocabulary of tokens.

Some examples of the method, apparatus, and non-transitory computer readable medium further include training the image encoder using an image training set based on a vector quantized generative adversarial network (VQGAN) training method. Some examples further include training the sketch encoder using a sketch training set based on a VQGAN training method.

Some examples of the method, apparatus, and non-transitory computer readable medium further include training a swapping autoencoder (SAE) model by swapping structure attributes and style attributes of a first training image and a second training image.

Figure 17:
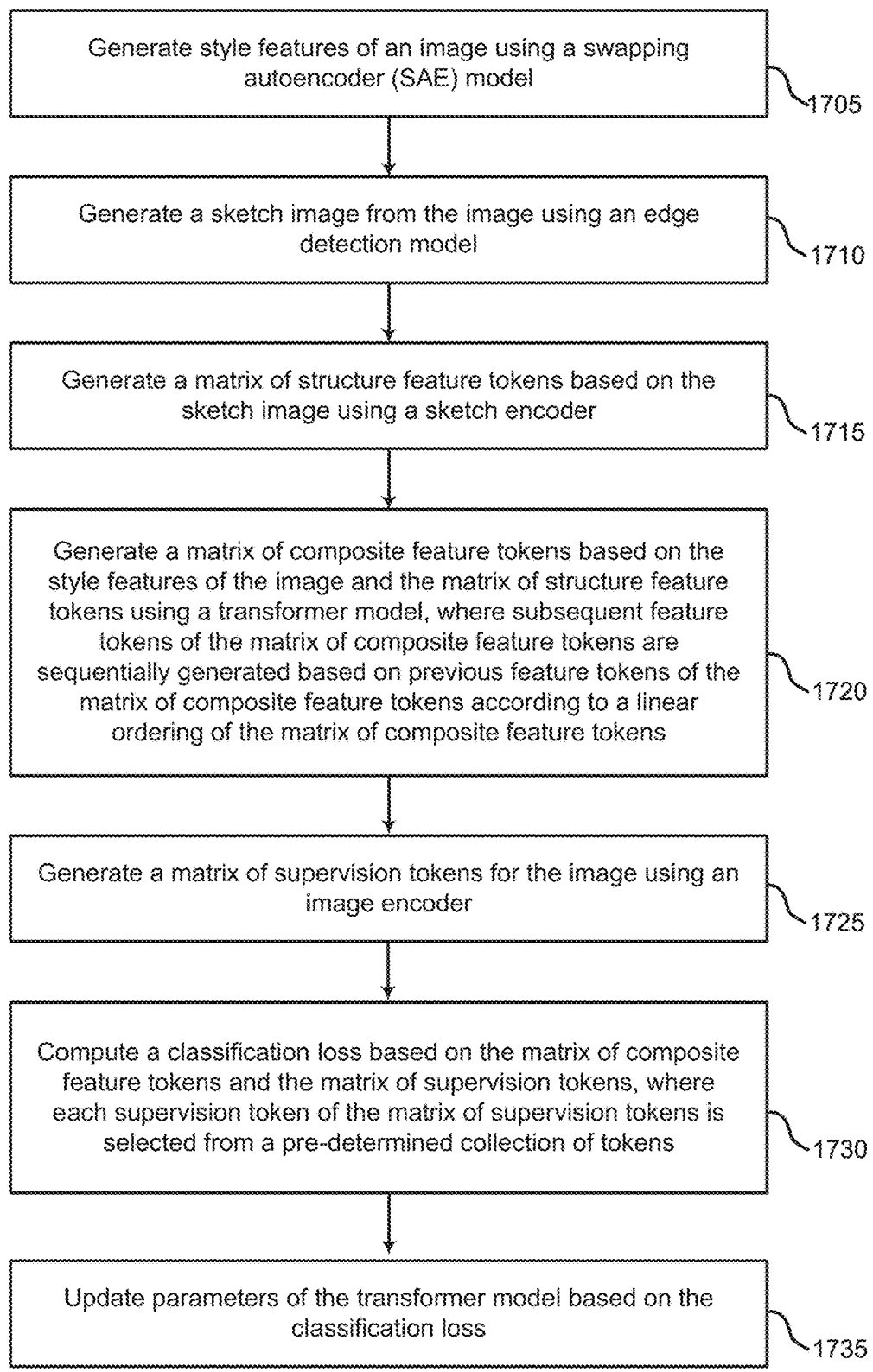
FIG. 17 shows an example of a method for training a machine learning model according to aspects of the present disclosure.

FIG. 17 shows an example of a method for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1705, the system generates style features of an image using a swapping autoencoder (SAE) model. In some cases, the operations of this step refer to, or may be performed by, a swapping autoencoder model as described with reference to FIGS. 2-4, and 20. The swapping autoencoder (SAE) model is trained in an unsupervised manner. Operation 1705 may further include an autoencoding operation and a swapping operation. The autoencoding operation converts input images, including unlabeled or unannotated input images, into two embeddings, i.e., style embeddings and structure embeddings. The swapping operation disentangles the tyle embeddings and the structure embeddings.

At operation 1710, the system generates a sketch image from the image using an edge detection model. In some cases, the operations of this step refer to, or may be performed by, an edge detection model as described with reference to FIG. 2. An edge detection model generates a sketch image that includes a sketch representation of an image, where the sketch representation highlights the predominant structure of an image. For example, the sketch representations is trained to capture target structure attributes of the image.

At operation 1715, the system generates a matrix of structure feature tokens based on the sketch image using a sketch encoder. In some cases, the operations of this step refer to, or may be performed by, a sketch encoder as described with reference to FIGS. 2, 3, 18, and 20.

At operation 1720, the system generates a matrix of composite feature tokens based on the style features of the image and the matrix of structure feature tokens using a transformer model, where subsequent feature tokens of the matrix of composite feature tokens are sequentially generated based on previous feature tokens of the matrix of composite feature tokens according to a linear ordering of the matrix of composite feature tokens. In some cases, the operations of this step refer to, or may be performed by, a transformer model as described with reference to FIGS. 2-4, 14, and 20. At operation 1720, a transformer model takes the style embeddings as input during training to retain the style attributes of the input image.

At operation 1725, the system generates a matrix of supervision tokens for the image using an image encoder. In some cases, the operations of this step refer to, or may be performed by, an image encoder as described with reference to FIGS. 5, 14, and 18-20.

At operation 1730, the system computes a classification loss based on the matrix of composite feature tokens and the matrix of supervision tokens, where each supervision token of the matrix of supervision tokens is selected from a pre-determined collection of tokens. In some cases, the operations of this step refer to, or may be performed by, a training component as described with reference to FIG. 2.

At operation 1735, the system updates parameters of the transformer model based on the classification loss. In some cases, the operations of this step refer to, or may be performed by, a training component as described with reference to FIG. 2.

Figure 18:
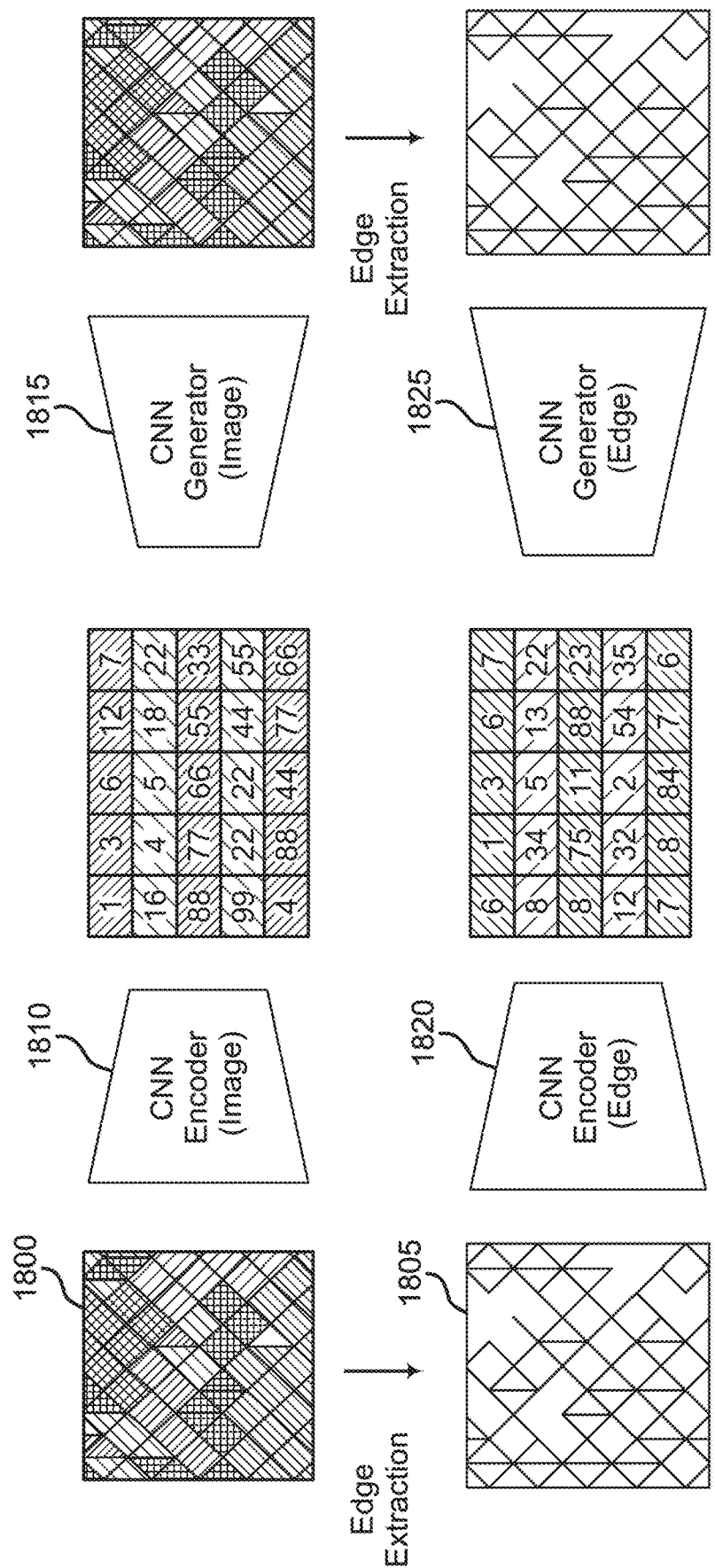
FIG. 18 shows an example of a method for training vector quantized generative adversarial network (VQGAN) image and edge according to aspects of the present disclosure.

FIG. 18 shows an example of training VQGAN image and edge according to aspects of the present disclosure. The example shown includes structure image 1800, sketch image 1805, image encoder 1810, image generator 1815, sketch encoder 1820, and sketch generator 1825.

According to an embodiment of the present disclosure, a VQGAN is trained to reconstruct an input image. FIG. 18 shows image VQGAN and sketch VQGAN. In some examples, sketch image 1805 is generated based on structure image 1800 using edge extraction method. Training is independent for the image VQGAN (at the top row of FIG. 18) and sketch VQGAN (at the bottom row).

In some examples, at the top row of FIG. 18, VQGAN for image includes image encoder 1810 that is a CNN-based encoder. Image encoder 1810 performs pixel-wise or block-wise embedding extraction on structure image 1800. Image encoder 1810 compresses the image into a quantized codebook representation. That is, extracted image embeddings are represented as tokens stored in a codebook. The quantized codebook representation is input to image generator 1815 that is a CNN-based generator. Image generator 1815 generates the desired output image (i.e., the structure image).

In some examples, at the bottom row of FIG. 18, VQGAN for edge includes sketch encoder 1820 that is a CNN-based encoder. Sketch encoder 1820 performs pixel-wise or block-wise embedding extraction on sketch image 1805. Sketch encoder 1820 compresses the sketch image into a quantized codebook representation. That is, extracted edge embeddings are represented as tokens stored in a codebook. The quantized codebook representation is input to sketch generator 1825 that is a CNN-based generator. Sketch generator 1825 generates the desired output image (i.e., the sketch image).

Structure image 1800 is an example of, or includes aspects of, the corresponding element described with reference to FIGS. 1, 7, and 9. Sketch image 1805 is an example of, or includes aspects of, the corresponding element described with reference to FIGS. 7, 8, 15, 16, and 20.

Image encoder 1810 is an example of, or includes aspects of, the corresponding element described with reference to FIGS. 5, 14, 19, and 20. Image generator 1815 is an example of, or includes aspects of, the corresponding element described with reference to FIGS. 2, 4, 5, and 19. Sketch encoder 1820 is an example of, or includes aspects of, the corresponding element described with reference to FIGS. 2, 3, and 20.

Figure 19:
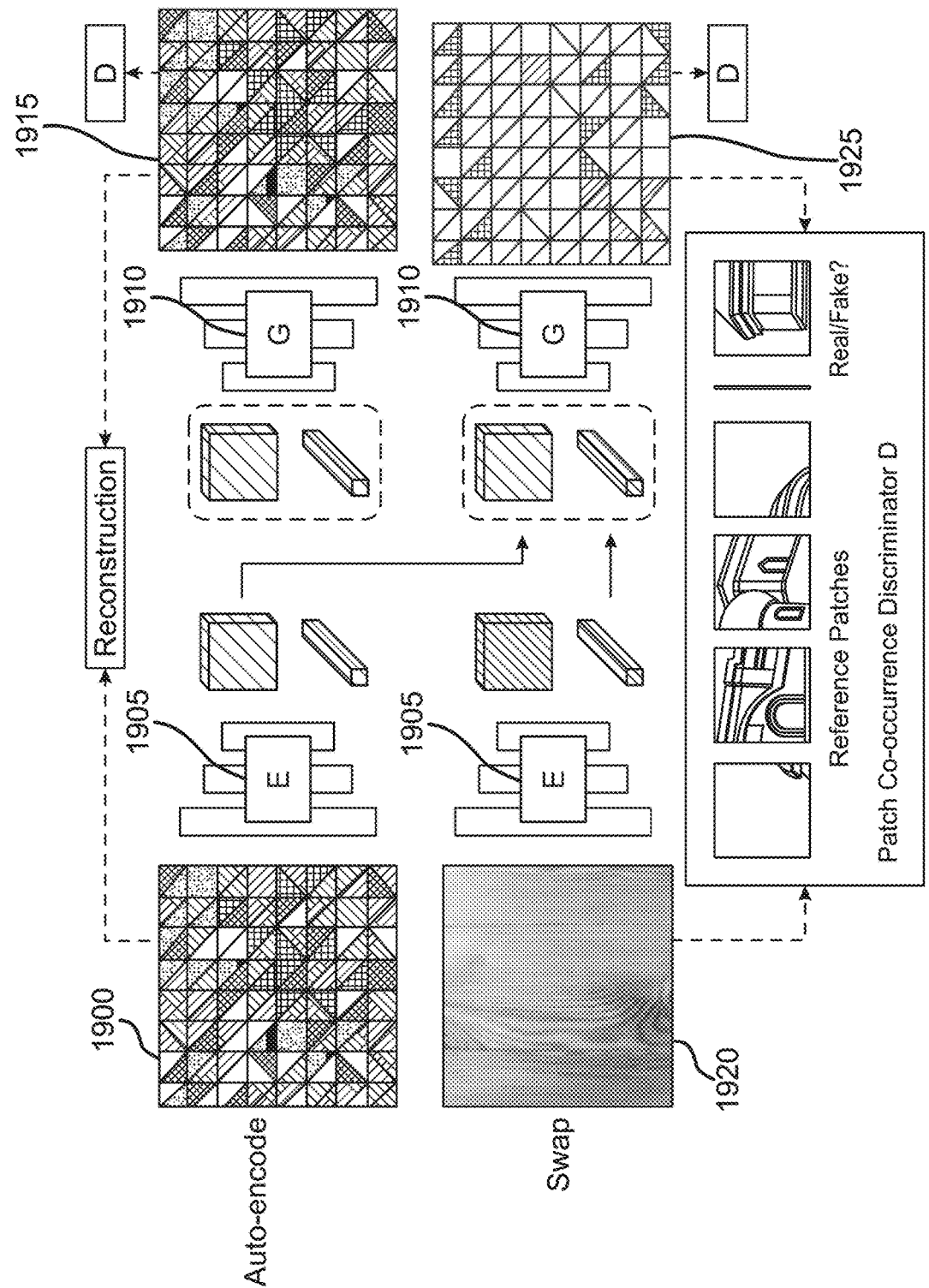
FIG. 19 shows an example of training a swapping autoencoder model according to aspects of the present disclosure.

FIG. 19 shows an example of training a swapping autoencoder model according to aspects of the present disclosure. The example shown includes first image 1900, image encoder 1905, image generator 1910, first reconstructed image 1915, second image 1920, and second reconstructed image 1925. In some cases, a swapping autoencoder (SAE) model facilitates disentangling of style embeddings and structure embeddings extracted from images. The SAE model is trained in an unsupervised manner and hence is not dependent on annotated data. The SAE model includes an image encoder 1905 (denoted as E) which embeds the input into two codes, i.e., style embedding and structure embedding. The style embedding is used in the subsequent steps of training. A patch co-occurrence discriminator $D_{patch}$ ensures that the generated image looks real and matches the texture of the first input image.

In some cases, the swapping autoencoder model includes autoencoding and swapping operations. Image encoder 1905 (also denoted as E) is configured to convert an input image into two codes, i.e., structure code and texture code. Image generator 1910 (also referred to as decoder G) and a discriminator D ensure the generation of a realistic image. In some examples, a reconstruction loss is used to ensure first reconstructed image 1915 resembles first image 1900. Similarly, the texture code is used for decoding from a second image. A patch co-occurrence discriminator $D_{patch}$ ensures that second reconstructed image 1925 looks real and matches the texture of first image 1900.

As shown in FIG. 19, image encoder 1905 extracts style embedding from second image 1920. The extracted style embedding is used in subsequent training steps. Image encoder 1905 is an example of, or includes aspects of, the corresponding element described with reference to FIGS. 5, 14, 18, and 20. Image generator 1910 is an example of, or includes aspects of, the corresponding element described with reference to FIGS. 2, 4, 5, and 18.

Figure 20:
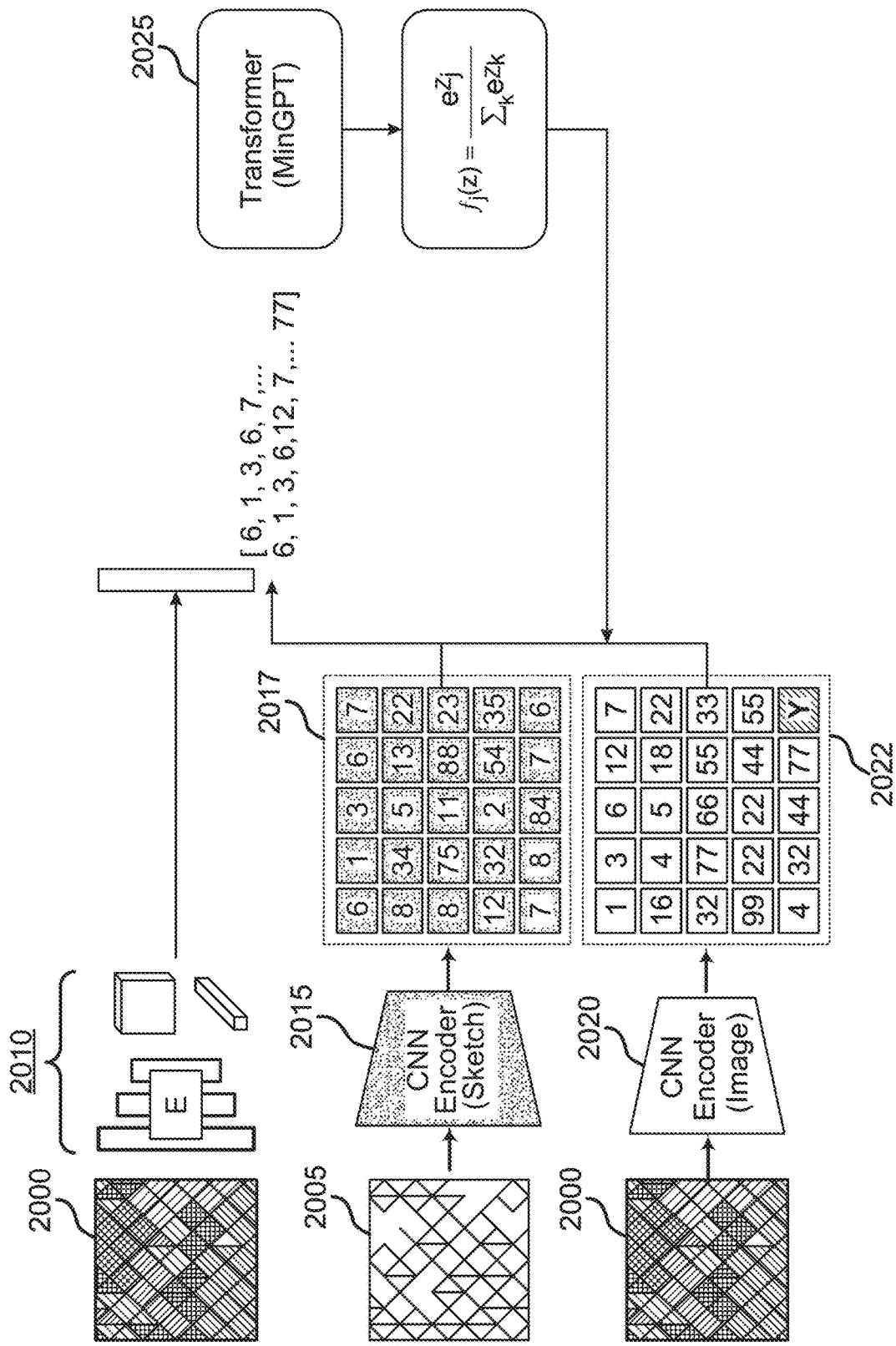
FIG. 20 shows an example of combined transformer model training according to aspects of the present disclosure.

FIG. 20 shows an example of combined transformer model training according to aspects of the present disclosure. The example shown includes style image 2000, sketch image 2005, swapping autoencoder model 2010, sketch encoder 2015, first codebook 2017, image encoder 2020, second codebook 2022, and transformer model 2025. According to an embodiment of the present disclosure, combined transformer training involves training transformer model 2025 (e.g., MinGPT). In some cases, machine learning model 225 includes swapping autoencoder model 2010 that generates style embedding of style image 2000. Sketch encoder 2015 generates first codebook 2017 based on sketch image 2005. Image encoder 2020 generates second codebook 2022 based on style image 2000. Machine learning model 225 as shown in FIG. 2 unrolls and concatenates first codebook 2017 and second codebook 2022 to obtain a vector (e.g., [6, 1, 3, 6, 7, . . . 6, 1, 3, 6, 12, 7, . . . ,77]). Style embedding from swapping autoencoder model 2010 is inserted at the beginning of the vector. Transformer model 2025 performs next token prediction using the concatenated conditional and image tokens. "Y" is masked in the input to transformer model 2025. The image codebook (i.e., second codebook 2022) is used to train transformer model 2025 to look at prior context. Image tokens (0, n−1) are concatenated and a token "Y" is predicted. Transformer model 2025 generates output $$f_j(z) = \frac{e^{zj}}{\sum_k e^{zk}},$$

where z is the codebook index. In some cases, first codebook 2017 and second codebook 2022 may be referred to as a sketch codebook and an image codebook, respectively.

In some embodiments, machine learning model 225 takes a grid of feature tokens (e.g., structure, color, text, etc.), unrolls the grid of feature tokens row major, and concatenates the grid of feature tokens. In some cases, the grid of feature tokens is also referred to as first codebook 2017. During training, machine learning model 225 concatenates image feature tokens for the same sample and masks out the last token. In some cases, image feature tokens are also referred to as second codebook 2022. Transformer 2025 is trained to predict the masked token. At inference, machine learning model 225 predicts each of the image tokens that form the grid of feature tokens. In some examples, if the token grid is 16×16, when unrolled they become 256. Machine learning model 225 predicts each of the 256 during inference but conditioning each prediction on the previously predicted tokens. That is, each predicted value takes into context the previously predicted image tokens along with the conditioning tokens that are present.

In some cases, swapping autoencoder model 2010 extracts style embedding from style image 2000. The style embedding is referred to as style cue. A pre-trained style embedding from swapping autoencoder model 2010 is used as style cue. Swapping autoencoder model 2010 is a VAE that learns to reconstruct images like VQGAN. In some examples, swapping autoencoder model 2010 disentangles images into structure and style codes in its intermediate latent representation. The structure code defines the overall structure of the image, i.e., capturing aspects such as hard and soft edges. The style code encapsulates the fine detail and recurring patterns in the image including color, texture, lighting, and high frequency details.

Using the style and structure (sketch) conditioning, transformer model 2025 is trained to generate next tokens in the VQGAN compressed space. In some examples, the style embedding from swapping autoencoder model 2010 is concatenated at position 0 of the vector (i.e., at the beginning of the vector). That is, the style embeddings are added to the tokens obtained from sketch encoder 2015. Transformer model 2025 learns to predict the next token in a series (e.g., series is the RGB image VQGAN tokens) by masking the last token from the ground truth and trying to predict it. For example, a 256×256 sized image may lead to 16×16 tokens. The 16×16 sketch token representation and the style cue embedding are used as conditioning while training transformer model 2025. The total conditioning is 1 (style)+256 (sketch)+255 (image) context tokens. During training, the last token is masked. The edge conditioning enables transformer model 2025 to autoregressively predict the next tokens at inference (i.e., one token at a time in a serial manner). As a result, high quality backgrounds hallucinated by transformer model 2025 can be predicted by repeating the process over the canvas. In some examples, the canvas size is arbitrary. Sketch is a modality selected herein and embodiments of the present disclosure are not limited to sketch conditioning. Any representation that captures varying degrees of structure is applicable here.

Style image 2000 is an example of, or includes aspects of, the corresponding element described with reference to FIGS. 1 and 7. Sketch image 2005 is an example of, or includes aspects of, the corresponding element described with reference to FIGS. 7, 8, 15, 16, and 18. Swapping autoencoder model 2010 is an example of, or includes aspects of, the corresponding element described with reference to FIGS. 2-4. Sketch encoder 2015 is an example of, or includes aspects of, the corresponding element described with reference to FIGS. 2, 3, and 18. Image encoder 2020 is an example of, or includes aspects of, the corresponding element described with reference to FIGS. 5, 14, 18, and 19. Transformer model 2025 is an example of, or includes aspects of, the corresponding element described with reference to FIGS. 2-4, and 14.

Performance of apparatus, systems and methods of the present disclosure have been evaluated, and results indicate embodiments of the present disclosure have obtained increased performance over existing technology. Example experiments demonstrate that image generation apparatus 200 as shown in FIG. 2 outperforms conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing, comprising:
identifying target style attributes and target structure attributes for a composite image;
ordering structure feature tokens of a matrix of structure feature tokens to obtain a sequence of structure feature tokens;
combining the sequence of structure feature tokens with target style features to obtain a combined sequence of feature tokens;
generating a matrix of composite feature tokens based on the target style attributes, the target structure attributes, and the combined sequence of feature tokens, wherein the matrix of composite feature tokens comprises a two-dimensional arrangement of composite feature tokens having a plurality of rows and a plurality of columns, and wherein subsequent feature tokens of the matrix of composite feature tokens are autoregressively generated based on previous feature tokens of the matrix of composite feature tokens according to a linear ordering of the matrix of composite feature tokens; and
generating the composite image based on the matrix of composite feature tokens, wherein the composite image includes the target style attributes and the target structure attributes.

2. The method of claim 1, further comprising:
generating the target style features and dispensable structure features based on a style image that includes at least a portion of the target style attributes, wherein the target style features represent the target style attributes.

3. The method of claim 2, further comprising:
identifying an additional style image;
generating additional target style features based on the additional style image; and
combining the target style features and the additional target style features to obtain combined target style features, wherein the matrix of composite feature tokens is generated based on the combined target style features.

4. The method of claim 3, further comprising:
identifying a spatial weighting for the style image and the additional style image, wherein the target style features and the additional target style features are combined based on the spatial weighting.

5. The method of claim 1, further comprising:
selecting a color palette of a style image, wherein the color palette comprises color distribution information of the style image, and wherein the target style attributes include the color palette.

6. The method of claim 5, further comprising:
receiving a grayscale image that includes the target structure attributes; and
generating a grayscale image embedding that represents the target structure attributes based on the grayscale image, wherein the matrix of composite feature tokens is generated based on the grayscale image embedding and the color palette.

7. The method of claim 1, further comprising:
receiving a text query that specifies at least a portion of the target style attributes; and
generating a text embedding based on the text query, wherein the matrix of composite feature tokens is generated based on the text embedding.

8. The method of claim 1, further comprising:
receiving a structure image that includes the target structure attributes;
generating a sketch image of the structure image based on an edge detection model, wherein the sketch image includes the target structure attributes; and
generating the matrix of structure feature tokens based on the sketch image.

9. The method of claim 1, further comprising:
identifying a row of the matrix of composite feature tokens;
identifying a set of previous feature tokens in the row of the matrix of composite feature tokens; and
generating a next feature token in the row of the matrix of composite feature tokens based on the set of previous feature tokens in the row of the matrix of composite feature tokens.

10. The method of claim 9, further comprising:
identifying a row of the matrix of structure feature tokens corresponding to the row of the matrix of composite feature tokens, wherein the next feature token is generated based on the row of the matrix of structure feature tokens.

11. The method of claim 9, wherein:
the next feature token in the row of the matrix of composite feature tokens is generated independently of a previous row in the matrix of composite feature tokens.

12. The method of claim 1, wherein:
each composite feature token of the matrix of composite feature tokens represents a vector from a vector quantized generative adversarial network (VQGAN) codebook.

13. The method of claim 1, wherein:
the target style attributes include color information, texture information, lighting information, high frequency information, or any combination thereof.

14. A method for training a machine learning model, comprising:
generating style features of an image using a swapping autoencoder (SAE) model;
generating a sketch image from the image using an edge detection model;
generating a matrix of structure feature tokens based on the sketch image using a sketch encoder;
ordering structure feature tokens of the matrix of structure feature tokens to obtain a sequence of structure feature tokens;
combining the sequence of structure feature tokens with the style features to obtain a combined sequence of feature tokens;
generating, using a transformer model, a matrix of composite feature tokens based on the style features of the image, the matrix of structure feature tokens, and the combined sequence of feature tokens, wherein the matrix of composite feature tokens comprises a two-dimensional arrangement of composite feature tokens having a plurality of rows and a plurality of columns, and wherein subsequent feature tokens of the matrix of composite feature tokens are autoregressively generated based on previous feature tokens of the matrix of composite feature tokens according to a linear ordering of the matrix of composite feature tokens;
generating a matrix of supervision tokens for the image using an image encoder;
computing a classification loss based on the matrix of composite feature tokens and the matrix of supervision tokens, wherein each supervision token of the matrix of supervision tokens is selected from a pre-determined collection of tokens; and
updating parameters of the transformer model based on the classification loss.

15. The method of claim 14, further comprising:
training the image encoder using an image training set based on a vector quantized generative adversarial network (VQGAN) training method; and
training the sketch encoder using a sketch training set based on a VQGAN training method.

16. The method of claim 14, further comprising:
training the SAE model by swapping structure attributes and style attributes of a first training image and a second training image.

17. An apparatus for image processing, comprising:
at least one processor;
at least one memory including instructions executable by the at least one processor;
a swapping autoencoder (SAE) model comprising parameters stored in the at least one memory and configured to generate target style features based on a style image, wherein the target style features represent target style attributes for a composite image;
a sketch encoder comprising code stored in the at least one memory and configured to generate a matrix of structure feature tokens based on a sketch image, wherein the matrix of structure feature tokens represents target structure attributes of the sketch image;
a transformer model comprising parameters stored in the at least one memory and trained to order structure feature tokens of the matrix of structure feature tokens to obtain a sequence of structure feature tokens, combine the sequence of structure feature tokens with the target style features to obtain a combined sequence of feature tokens, and generate a matrix of composite feature tokens based on the target style features, the matrix of structure feature tokens, and the combined sequence of feature tokens, wherein the matrix of composite feature tokens comprises a two-dimensional arrangement of composite feature tokens having a plurality of rows and a plurality of columns, and wherein subsequent feature tokens of the matrix of composite feature tokens are autoregressively generated based on previous feature tokens of the matrix of composite feature tokens according to a linear ordering of the matrix of composite feature tokens; and an image generator comprising parameters stored in the at least one memory and configured to generate the composite image based on the matrix of composite feature tokens, wherein the composite image includes the target style attributes and the target structure attributes.

18. The apparatus of claim 17, wherein:

the sketch encoder comprises a vector quantized generative adversarial network (VQGAN) encoder and the image generator comprises a VQGAN decoder.

19. The apparatus of claim 17, further comprising:

a multi-modal encoder configured to generate a text embedding representing additional target style attributes, wherein the matrix of composite feature tokens is generated based on the text embedding.

\* \* \* \* \*